(12) United States Patent
Konno et al.

(10) Patent No.: US 8,659,732 B2
(45) Date of Patent: Feb. 25, 2014

(54) LIQUID CRYSTAL DISPLAY DEVICE

(75) Inventors: Takayuki Konno, Kanagawa (JP);
Shinichi Nishida, Kanagawa (JP);
Hideki Ito, Kanagawa (JP); Takayuki Ishino, Kanagawa (JP); Tsutomu Kadotani, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 118 days.

(21) Appl. No.: 13/286,675

(22) Filed: Nov. 1, 2011

(65) Prior Publication Data

US 2012/0113343 A1  May 10, 2012

(30) Foreign Application Priority Data

Nov. 9, 2010  (JP) ................................. 2010-250719
Jan. 14, 2011  (JP) ................................. 2011-006150

(51) Int. Cl.
*G02F 1/1343* (2006.01)

(52) U.S. Cl.
USPC ............... 349/139; 349/38; 349/39; 349/138; 349/155

(58) Field of Classification Search
USPC ................... 349/38, 39, 138, 139, 141, 155
See application file for complete search history.

(56) References Cited

U.S. PATENT DOCUMENTS

| | | | | |
|---|---|---|---|---|
| 7,483,113 B2* | 1/2009 | Paik et al. | ...................... | 349/156 |
| 7,688,410 B2* | 3/2010 | Kim et al. | ...................... | 349/114 |
| 2001/0019372 A1* | 9/2001 | Ootsu et al. | ...................... | 349/38 |
| 2002/0149729 A1* | 10/2002 | Nishimura et al. | ........... | 349/141 |
| 2002/0159016 A1* | 10/2002 | Nishida et al. | ................ | 349/141 |
| 2010/0053529 A1* | 3/2010 | Kanaya et al. | ................ | 349/139 |
| 2010/0110355 A1* | 5/2010 | Okazaki et al. | ............... | 349/123 |

FOREIGN PATENT DOCUMENTS

| | | | | |
|---|---|---|---|---|
| JP | 11-311808 A | | 11/1999 | |
| JP | 2002-258321 A | | 9/2002 | |
| JP | 2002-323706 A | | 11/2002 | |
| JP | 2007-212812 A | | 8/2007 | |
| JP | 2008-065300 A | | 3/2008 | |
| JP | 2009-175568 | * | 8/2009 | ............ G02F 1/1339 |
| JP | 2009-175568 A | | 8/2009 | |
| JP | 2009-237012 A | | 10/2009 | |

OTHER PUBLICATIONS

Japanese Office Action issued Jan. 22, 2013 in corresponding Japanese Patent Application No. 2011-006150.

* cited by examiner

*Primary Examiner* — Edward Glick
*Assistant Examiner* — Sang V Nguyen
(74) *Attorney, Agent, or Firm* — Sughrue Mion, PLLC

(57) ABSTRACT

To provide an active-matrix type liquid crystal display device having a structure in which alignment of flattening films formed in the display region is uniform and fine, which can secure a large storage capacitance with a small area and achieve a high numerical aperture. A recessed region having no flattening film is formed in a part on a source electrode. In the recessed region, a common electrode made with a transparent conductive film covers a source electrode to form a second storage capacitor.

8 Claims, 30 Drawing Sheets

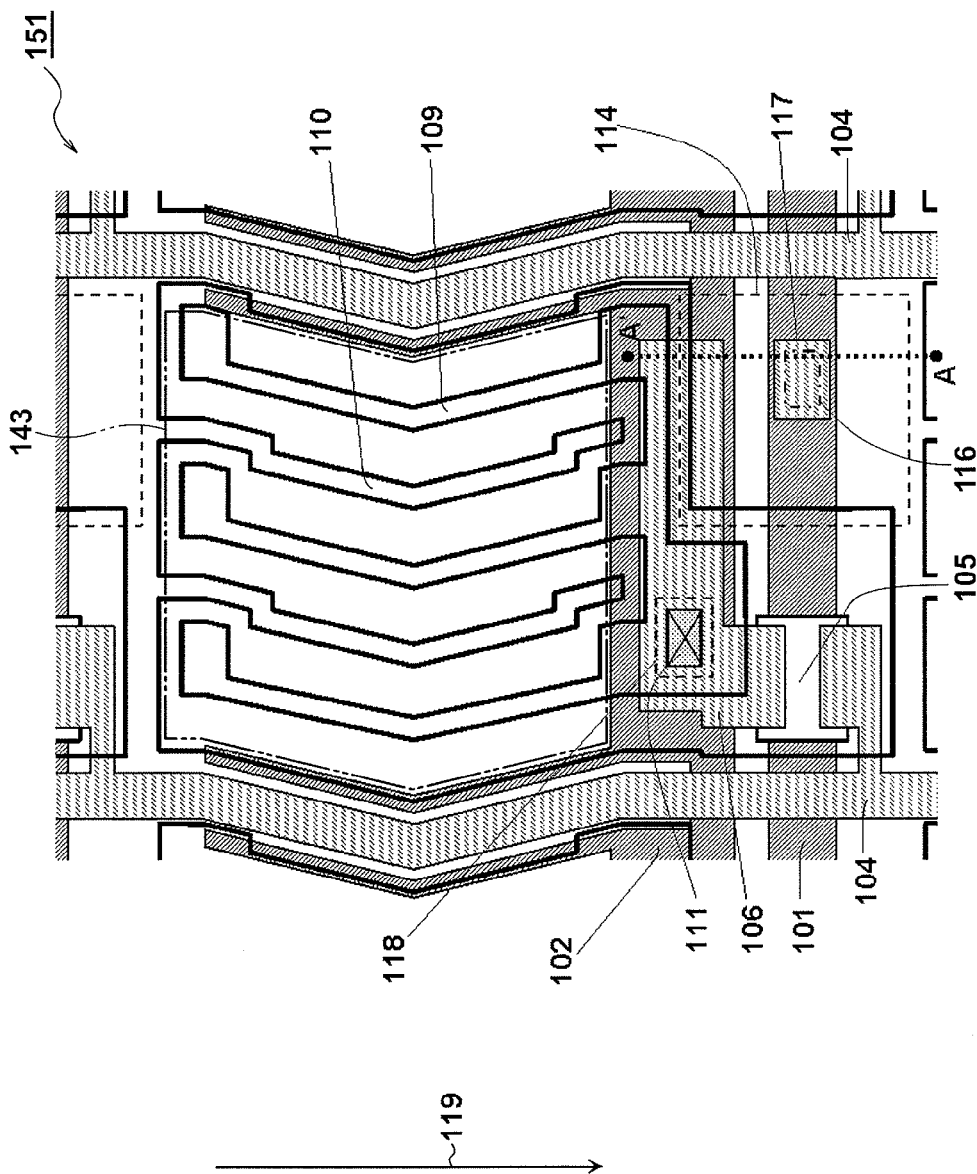

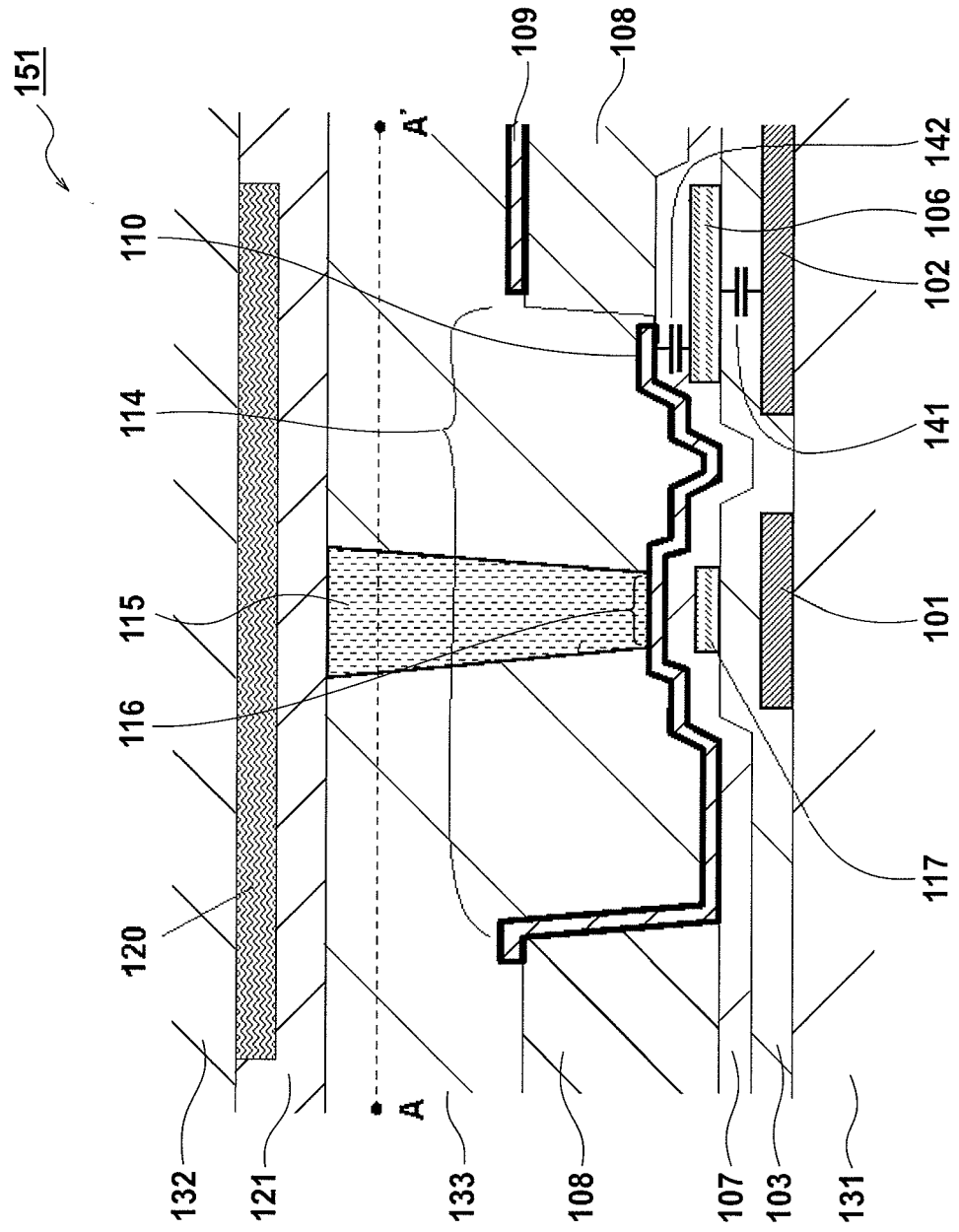

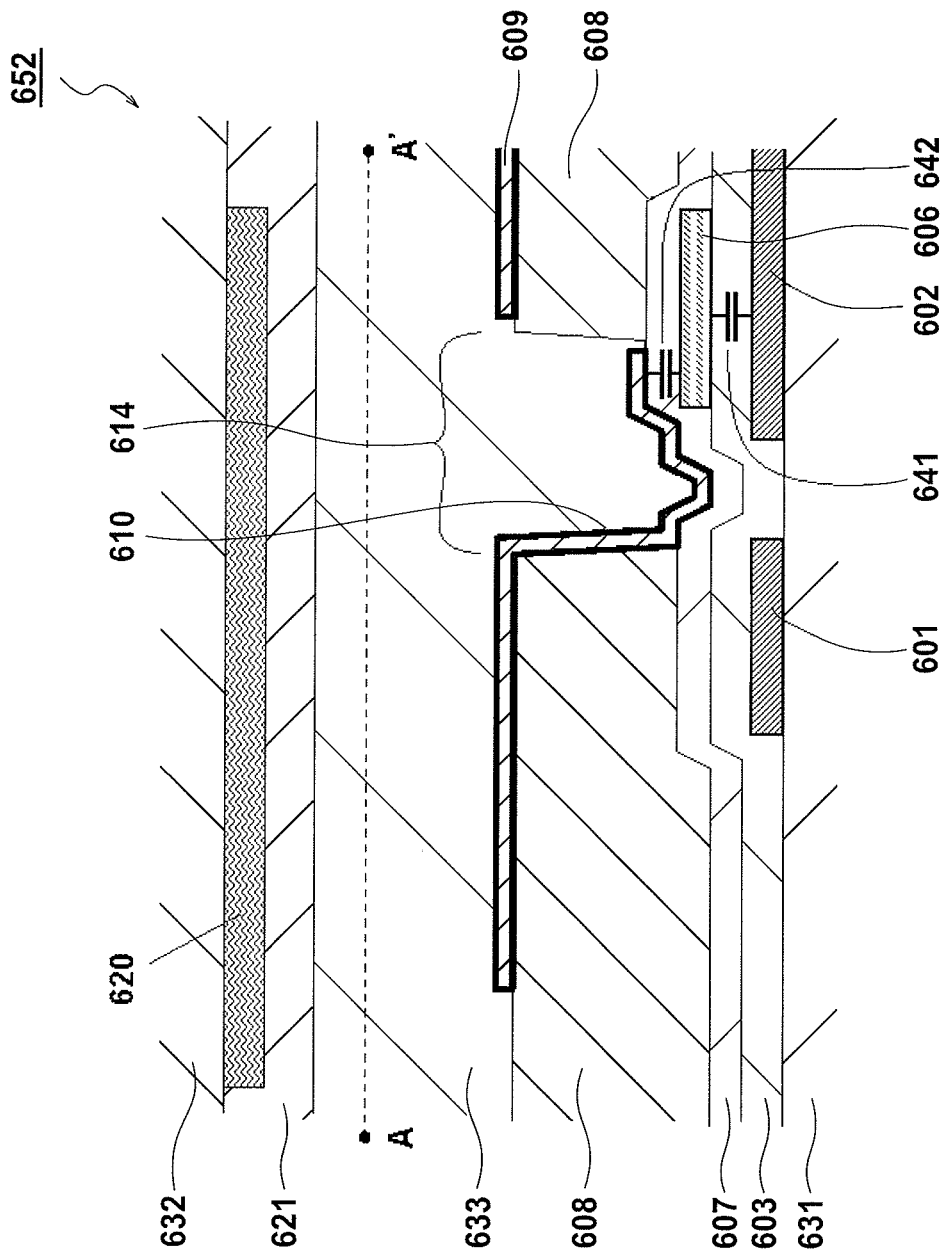

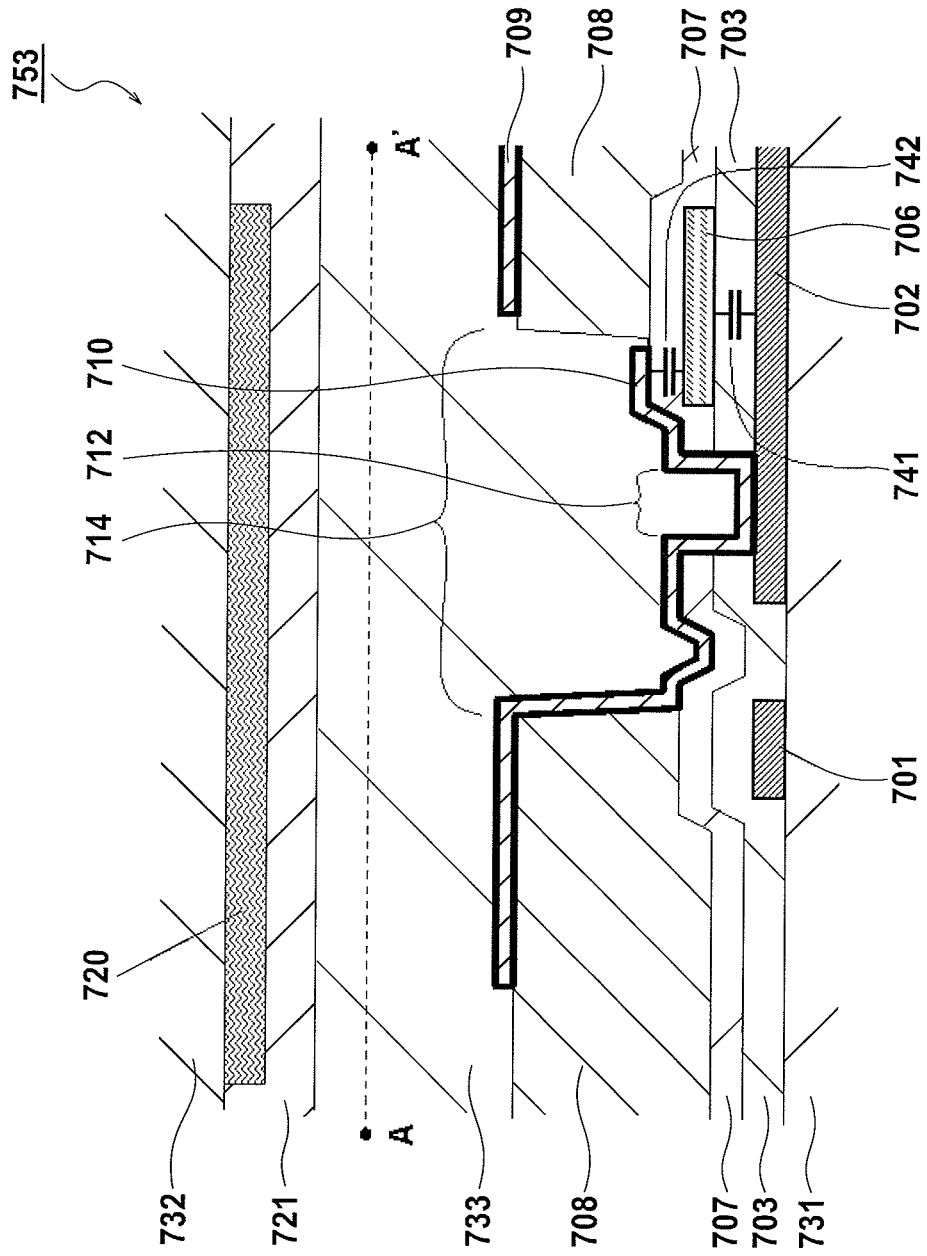

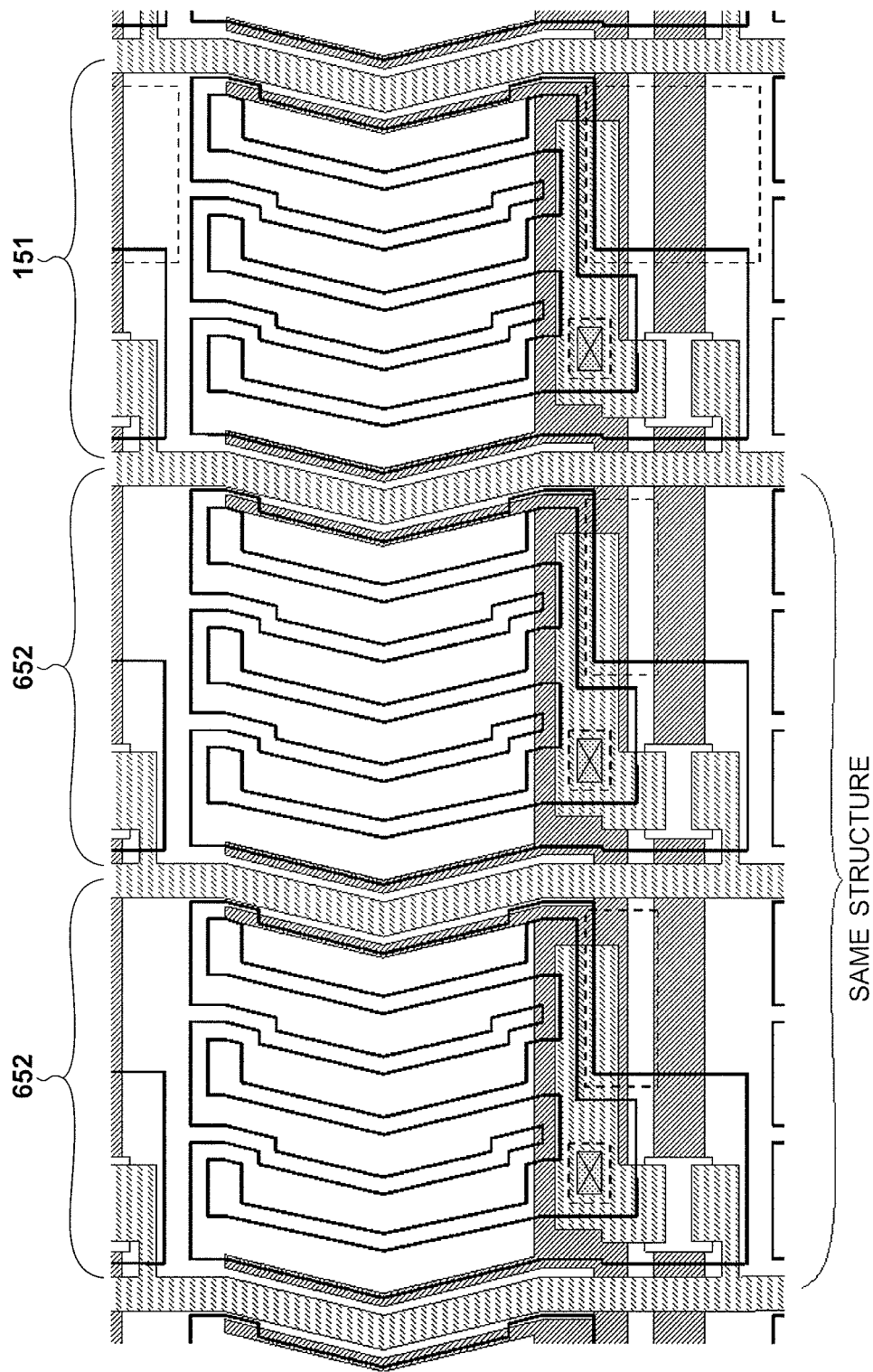

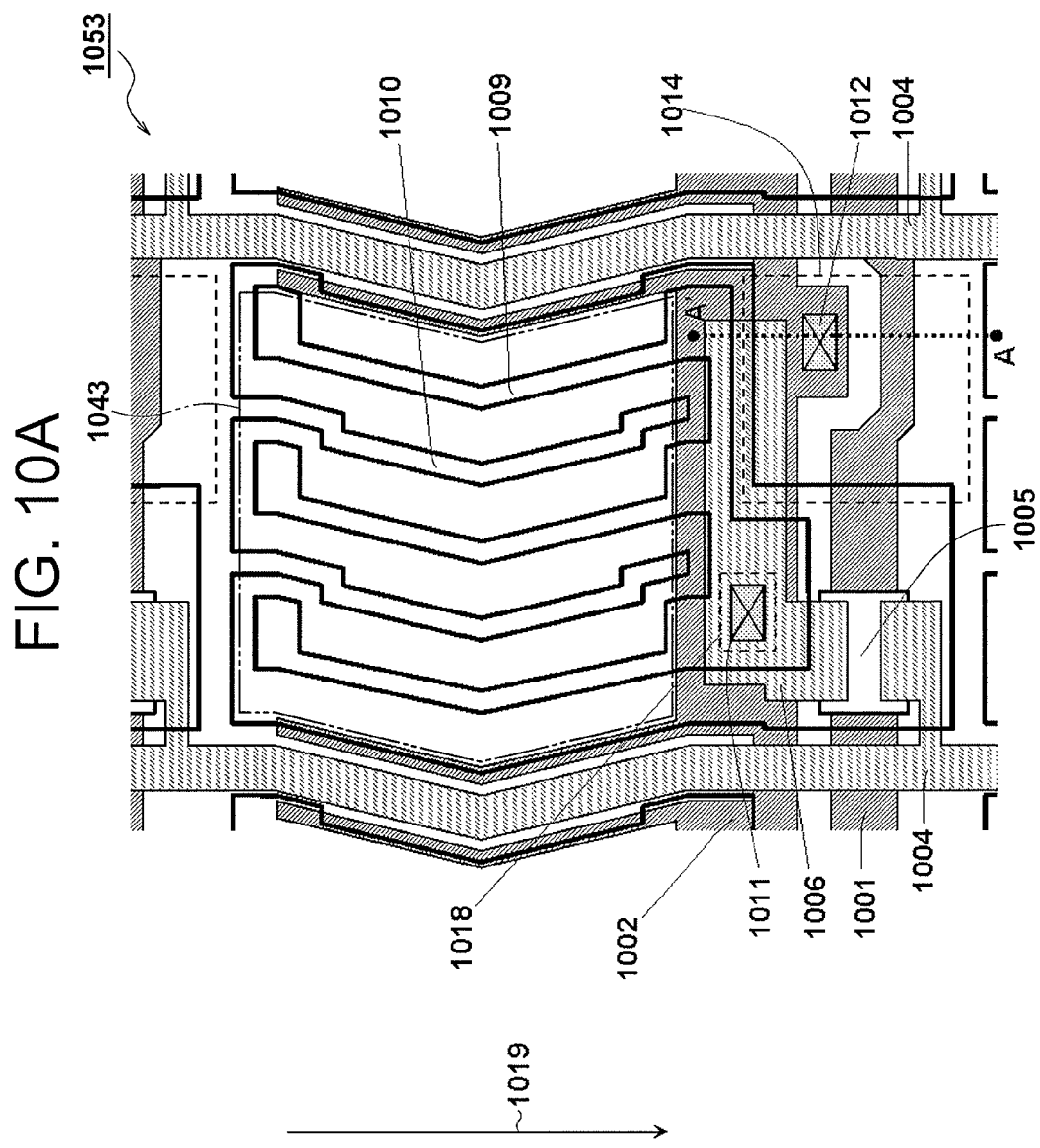

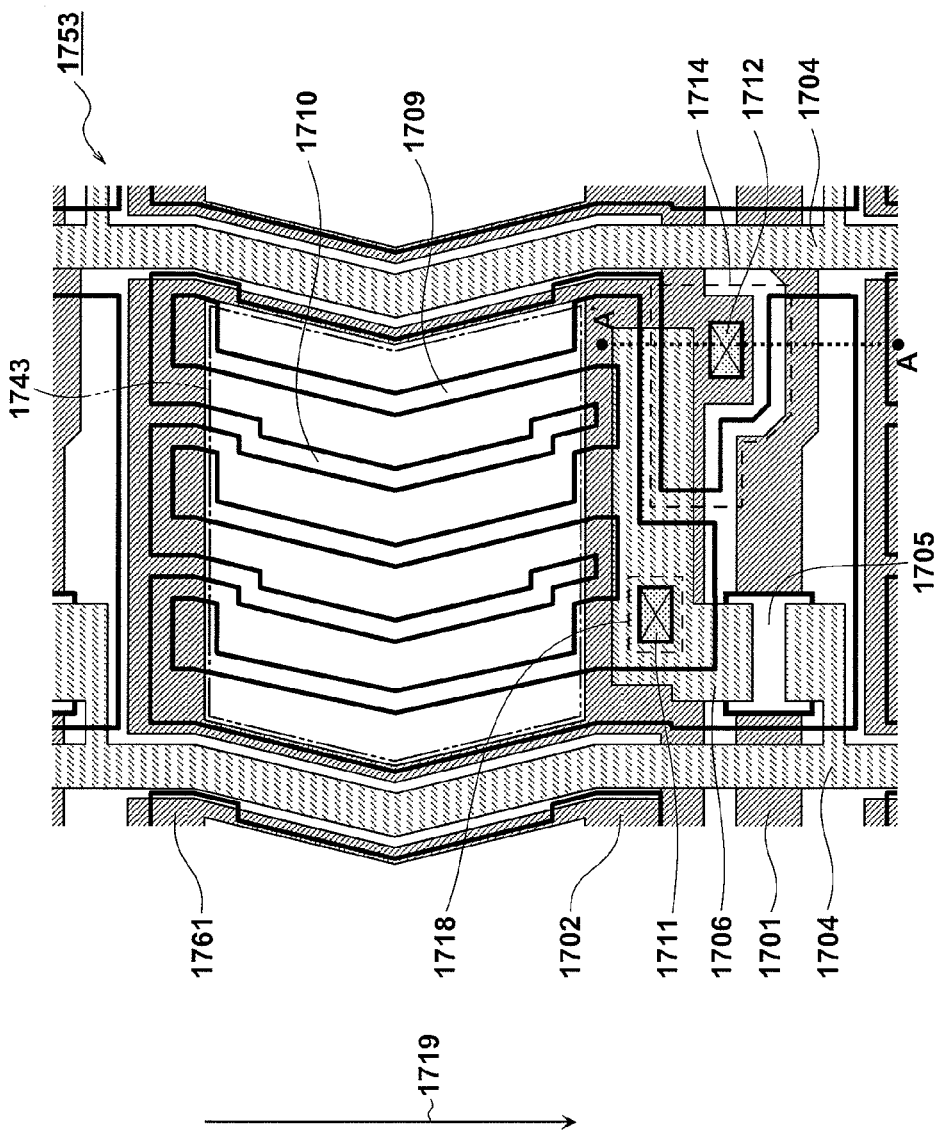

LIQUID CRYSTAL DISPLAY DEVICE

CROSS-REFERENCE TO RELATED APPLICATIONS

This application is based upon and claims the benefit of priority from Japanese patent application No. 2010-250719, filed on Nov. 9, 2010, and Japanese patent application No. 2011-006150 filed on Jan. 14, 2011, the disclosure of which is incorporated herein in its entirety by reference.

BACKGROUND OF THE INVENTION

1. Field of the Invention

The present invention relates to a liquid crystal display device and, more specifically, to an In-Plane Switching (referred to as "IPS" hereinafter) active matrix type liquid crystal display device which is of a high numerical aperture and a high contrast.

2. Description of the Related Art

Recently, the use of IPS for large-scaled monitors of TV (television sets) and the like has become popular. The IPS enables a display by rotating axes of liquid crystal molecules within a plane in parallel to a substrate by a transverse electric field. Thus, there is no viewing angle dependency for the angles of the rise of the molecular axes, so that the viewing angle property thereof becomes advantageous greatly compared to that of TN (Twisted Nematic) mode (see Japanese Unexamined Patent Publication 2002-323706 (Patent Document 1), pp. 20-24, FIG. 1, for example).

In the meantime, with the IPS, pixel electrodes and common electrodes are arranged in a comb-like form, and a lateral electric field is applied thereto. Thus, the proportion of the electrode area occupying the display region becomes high, which results in having a low numerical aperture. However, recently, there has been an improvement in regards to such issue. As a related technique of the present invention, an example of the IPS will be described. FIG. 13A shows a plan view of a single sub-pixel, and FIG. 13B shows a sectional view taken along a line A-A' of FIG. 13A. FIG. 13A shows a plan view of a TFT (Thin Film Transistor) substrate side which constitutes a liquid crystal display device.

A sub-pixel 1351 shown in FIG. 13A and FIG. 13B will be described. On a TFT substrate 1331, a scan signal wiring 1301 formed with a first metal layer and two parallel common signal wirings 1302 are formed. A gate insulating film 1303 is formed on the scan signal wiring 1301 and the common signal wirings 1302, and a video signal line 1304 formed with a second metal layer, a thin film semiconductor layer 1305, as well as a source electrode 1306 formed with the second metal layer are formed on the gate insulating film 1303. A passivation film 1307 is formed on the video signal wiring 1304, the thin film semiconductor layer 1305, and the source electrode 1306, and a flattening film 1308 made with an organic film is further formed on the passivation film 1307. A pixel electrode 1309 made with a transparent conductive film and a common electrode 1310 made with a transparent conductive film are formed on the flattening film 1308.

The video signal wiring 1304 in its wiring width direction is completely covered by the common electrode 1310 via the passivation film 1307 and the flattening film 1308. Note here that the pixel electrode 1309 is electrically connected to the source electrode 1306 via a contact hole 1312, and the common electrode 1310 is electrically connected to the common signal wiring 1302 via a contact hole 1312. A region where the common signal wiring 1302 and the source electrode 1306 overlap on one another becomes a storage capacitor 1341. Hereinafter, the contact hole connecting the common electrode and the common signal wiring is referred to as a "common-electrode contact hole", and the contact hole connecting the pixel electrode and the source electrode is referred to as a "pixel-electrode contact hole".

On a counter electrode 1332 side, a columnar spacer 1315 for keeping the gap between the counter substrate 1332 and the TFT substrate 1331 is formed. In a periphery of the part of the TFT substrate 1331 where the columnar spacer 1315 is placed, there is a recessed region 1314 where there is no flattening film 1308. The recessed region 1314 is provided in a wider range than the size (width direction) of the columnar spacer 1315 by considering the shift between the TFT substrate 1331 and the counter substrate 1332. Other than that, the flattening film 1308 exists on the entire surface of the sub-pixel 1351 except for the area in the vicinity of the pixel electrode contact hole 1311 which connects the pixel electrode 1309 and the source electrode 1306.

A display region 1343 is a region where the pixel electrode 1309 and the common electrode 1310 are formed in a comb-like pattern. This region exhibits a high flat property since the flattening film 1308 is provided as the base, so that it is possible to have a fine alignment. Further, the pixel electrode 1309 and the common electrode 1310 arranged in a comb-like pattern are both formed with the transparent electrodes, so that the region thereof also contributes to the transmittance. The video signal wiring 1304 in its wiring width direction is completely covered from the above by the common electrode 1310. Because of such structure, the aperture part that transmits visible light can be expanded to the vicinity of the fringe of the video signal wiring 1304.

Patent Document 1: Japanese Unexamined Patent Publication 2002-323706 (pp. 20-24, FIG. 1) With recent liquid crystal display devices, high-definition screens and narrower pitches thereof are advanced more and more due to increases in high end use such as medical fields and the like. Thus, a higher numerical aperture is desired. For that, a large area is required for acquiring a large storage capacitor. However, with the related technique described above, the higher the definition becomes, the higher the proportion of the storage capacitor occupying the pixel area becomes. This makes it difficult to achieve a high numerical aperture.

It is therefore an exemplary object of the present invention to provide a liquid crystal display device which can secure a large storage capacitor with a small area by a structure that can provide a uniform and fine alignment through forming a flattening film in a display region.

SUMMARY OF THE INVENTION

The liquid crystal display device according to an exemplary aspect of the invention is an IPS liquid crystal display device which drives a liquid crystal layer by an electric field generated between a common electrode and a pixel electrode, and the device is characterized to include: a TFT substrate in which a great number of sub-pixels having display regions are provided in matrix; a counter substrate provided by opposing to the TFT substrate; the liquid crystal layer sandwiched between the counter substrate and the TFT substrate; a scan signal wiring and a common signal wiring provided on the TFT substrate; a first insulating film provided on the TFT substrate, the scan signal wiring, and the common signal wiring; a source electrode provided on the first insulating film; a second insulating film provided on the first insulating film and the source electrode; a flattening film provided on the second insulating film; the common electrode made with a transparent conductive film, which is provided on the flattening film and connected to the common signal wiring; and the pixel electrode made with a transparent conductive film, which is provided on the flattening film and connected to the source electrode, wherein: the flattening film is formed in all areas of the display regions; a recessed region constituted with a region on the second insulating film where the flattening film is not provided includes a part on the source electrode; and the common electrode is extended inside the recessed region. The liquid crystal display device further includes: a first storage capacitor constituted with a structure in which the first insulating film is sandwiched between the common signal wiring and the source electrode; and a second storage capacitor provided inside the recessed region, which is constituted with a structure in which the second insulating film is sandwiched between the common electrode and the source electrode.

BRIEF DESCRIPTION OF THE DRAWINGS

FIG. 1A is a plan view showing a sub-pixel of a liquid crystal display device according to a first exemplary embodiment, in which a columnar spacer is placed;

FIG. 1B is a sectional view taken along an A-A' part of FIG. 1A;

FIG. 6B is a sectional view taken along an A-A' part of FIG. 6A;

FIG. 7B is a sectional view taken along an A-A' part of FIG. 7A;

FIG. 9 is a plan view showing sub-pixels for one pixel of the liquid crystal display device according to the second exemplary embodiment, in which a common electrode contact hole for connecting a common signal wiring and a common electrode is omitted;

FIG. 10A is a plan view showing a sub-pixel of a liquid crystal display device according to a third exemplary embodiment, in which a columnar spacer is not placed and a common electrode contact hole for connecting a common signal wiring and a common electrode is provided;

FIG. 17A is a plan view showing a sub-pixel of the liquid crystal display device according to the fourth exemplary embodiment, in which a columnar spacer is not placed and a common electrode contact hole for connecting a common signal wiring and a common electrode is provided;

DETAILED DESCRIPTION OF THE PREFERRED EMBODIMENTS

Figure 2A:
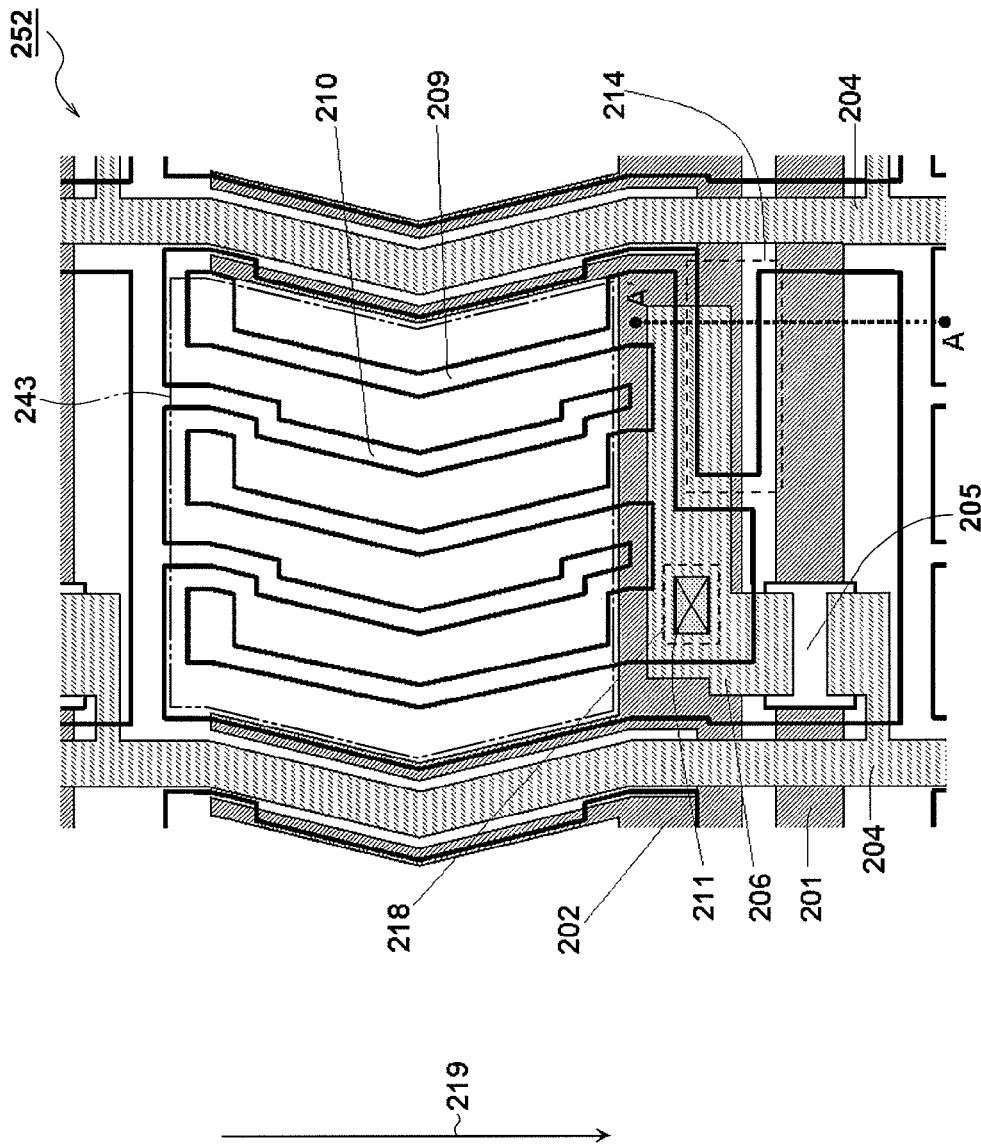
FIG. 2A is a plan view showing a sub-pixel of the liquid crystal display device according to the first exemplary embodiment, in which a columnar spacer is not placed.

The present invention will be described hereinafter by referring to the accompanying drawings. In the drawings, disclosed are: scan signal wirings 101, 201, 301, 601, 701, 1001, 1301, 1401, 1501, 1601, and 1701; common signal wirings 102, 202, 302, 602, 702, 1002, 1302, 1402, 1502, 1602, and 1702; gate insulating films (first insulating films)

103, 203, 303, 603, 703, 1003, 1303, 1403, 1503, 1603, and 1703; video signal wirings 104, 204, 304, 604, 704, 1004, 1304, 1404, 1504, 1604, and 1704; thin-film semiconductor layers 105, 205, 305, 605, 705, 1005, 1305, 1405, 1505, 1605, and 1705; source electrodes 106, 206, 306, 606, 706, 1006, 1306, 1406, 1506, 1606, and 1706; passivation films (second insulating films) 107, 207, 307, 607, 707, 1007, 1307, 1407, 1507, 1607, and 1707; flattening films 108, 208, 308, 608, 708, 1008, 1308, 1408, 1508, 1608, and 1708; pixel electrodes 109, 209, 309, 609, 709, 1009, 1309, 1409, 1509, 1609, and 1709; common electrodes 110, 210, 310, 610, 710, 1010, 1310, 1410, 1510, 1610, and 1710; pixel electrode contact holes 111, 211, 311, 611, 711, 1011, 1311, 1411, 1511, 1611, and 1711; common electrode contact holes 312, 412, 712, 812, 1012, 1112, 1312, 1512, 1612, and 1712; recessed regions 114, 214, 314, 614, 714, 1014, 1314, 1414, 1514, 1614, and 1714; columnar spacers 115, 1315, 1415, 1515, 1615, 1715; spacer supporting regions 116 and 1516; pedestals 117 and 1517; recessed regions 118, 218, 318, 618, 718, 1018, 1318, 1418, 1518, 1618, and 1718; rubbing directions 119, 219, 319, 619, 719, 1019, 1319, 1419, 1519, 1619, and 1719; black matrixes 120, 220, 320, 620, 720, 1020, 1320, 1420, 1520, 1620, and 1720; overcoats 121, 221, 321, 621, 721, 1021, 1321, 1421, 1521, 1621, and 1721; TFT substrates 131, 231, 331, 631, 731, 1031, 1331, 1431, 1531, 1631, and 1731; counter substrates 132, 232, 332, 632, 732, 1032, 1332, 1432, 1532, 1632, and 1732; liquid crystal layers 133, 233, 333, 633, 733, 1033, 1333, 1433, 1533, 1633, and 1733; a storage capacitor 1341, first storage capacitors 141, 241, 341, 641, 741, 1041, 1441, 1541, 1641, and 1741; second storage capacitors 142, 242, 342, 642, 742, 1042, 1442, 1542, 1642, and 1742; display regions 143, 243, 343, 643, 743, 1043, 1343, 1443, 1543, 1643, and 1743; a sub-pixel 1351; sub-pixels with columnar spacer 151 and 1551; sub-pixels 252, 552, 652, 952, 1252, and 1652 having no columnar spacer and no common electrode contact hole; sub-pixels 353, 453, 753, 853, 1053, 1153, and 1753 having no columnar spacer but having common electrode contact hole; and common auxiliary electrodes 1561, 1661, and 1761. However, the plan views show only the TFT substrate out of the liquid crystal display device. In the plan views, hatching is applied as necessary also on the planes for making it easy to understand. While different reference numerals are applied in each of the drawings even to the same structural elements, those under same structural element names have same functions unless it is specifically mentioned. Basically, duplicated explanations of those under the same structural element names and having the same functions are omitted. First, the basic structures of the present invention will be described by referring to FIG. 14A and FIG. 14B.

Figure 14A:
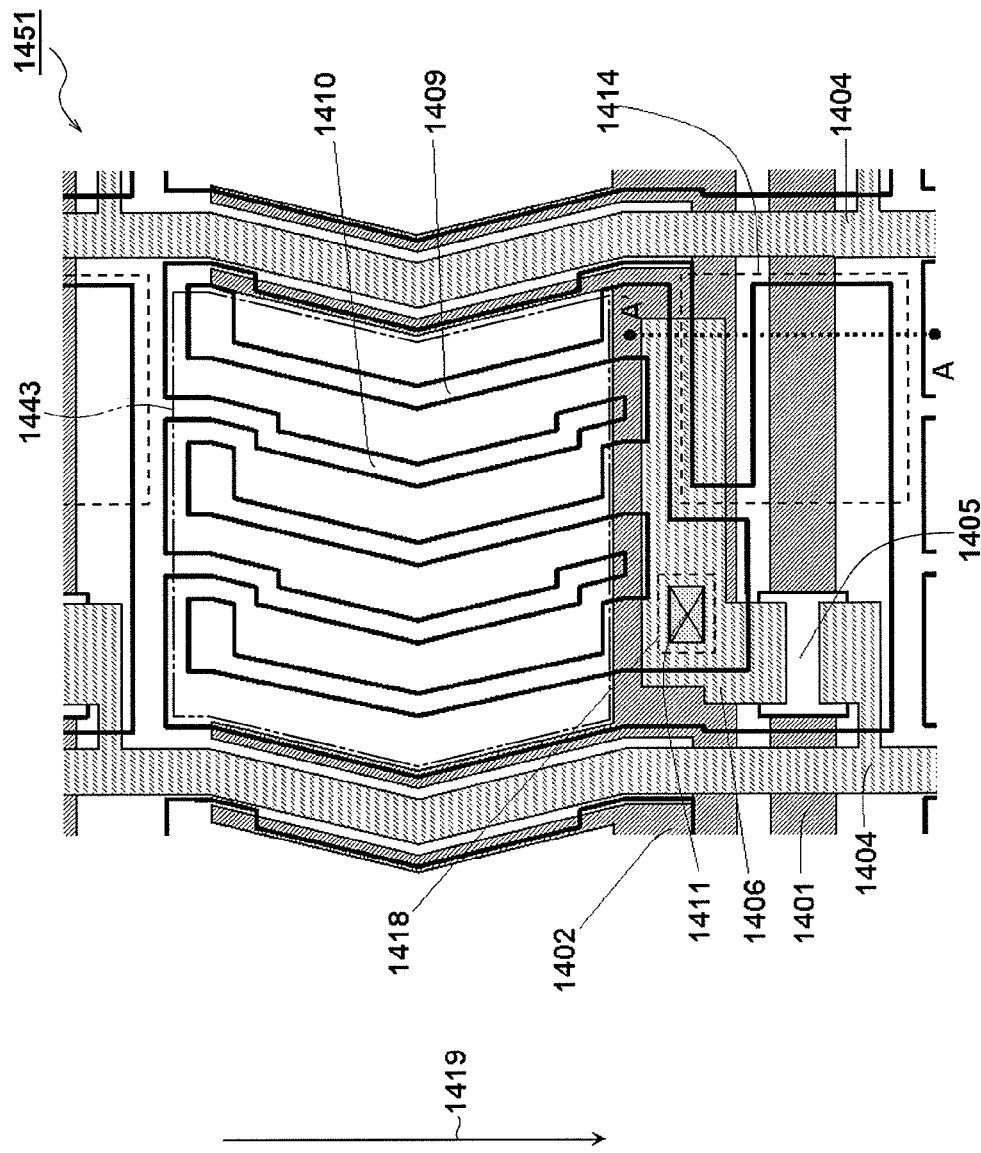
FIG. 14A is a plan view showing a sub-pixel in a basic structure of a liquid crystal display device according to the present invention, in which a columnar spacer is placed.
Figure 14B:
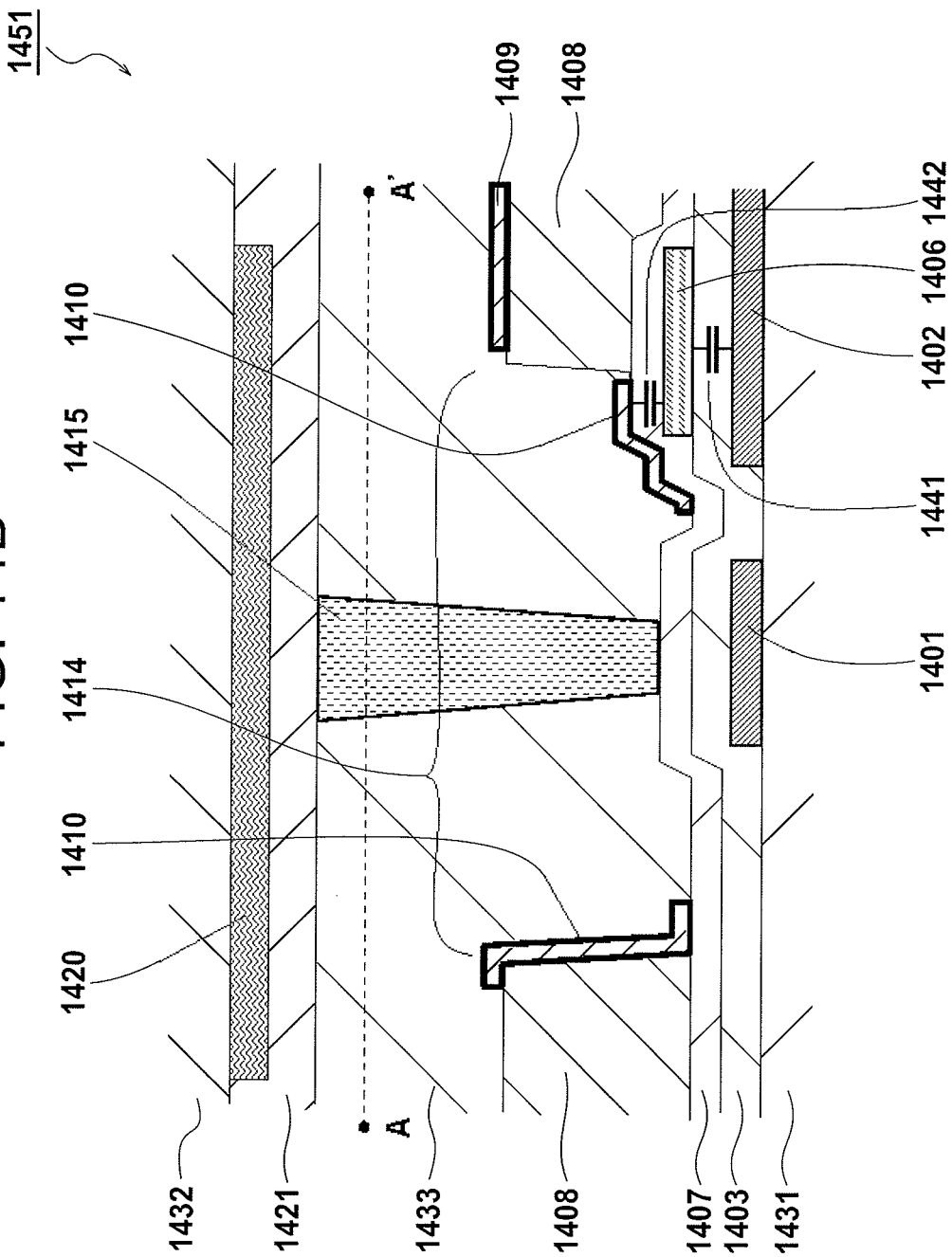
FIG. 14B is a sectional view taken along an A-A' part of FIG. 14A.

The liquid crystal display device according to the present invention includes: the TFT substrate 1431; the counter substrate 1432 provided by opposing to the TFT substrate 1431; the liquid crystal layer 1433 sandwiched between the counter substrate 1432 and the TFT substrate 1431; the scan signal wiring 1401 and the common signal wiring 1402 provided partially on the TFT substrate 1431; the gate insulating film 1403 as the first insulating film provided on the TFT substrate 1431 including the scan signal wiring 1401 and the common signal wiring 1402; the source electrode 1406 provided partially on the gate insulating film 1403; the passivation film 1407 as the second insulating film provided on the gate insulating film 1403 including the source electrode 1406; the flattening film 1408 provided partially on the passivation film 1407; the recessed region 1414 formed with a region of the passivation film 1407 where the flattening film 1408 is not formed; the pixel electrode 1409 made with a transparent conductive film provided partially on the flattening film 1408 and electrically connected to the source electrode 1406; the common electrode 1410 made with a transparent conductive film provided partially on the flattening film 1408 and on the passivation film 1407 within the recessed region 1414 and electrically connected to the common signal wiring 1402; the first storage capacitor 1441 formed with a structure in which the common signal wiring 1402 and the source electrode 1406 sandwich the gate insulating film 1403; and the second storage capacitor 1442 formed with a structure in which the common electrode 1410 and the source electrode 1406 sandwich the passivation film 1407. The liquid crystal display device according to the present invention is an IPS liquid crystal display device which applies an electric field generated between the common electrode 1410 and the pixel electrode 1409 to the liquid crystal layer 1433. The sub-pixel shown in FIG. 14A and FIG. 14B is the first sub-pixel 1451 in which the columnar spacer 1415 is placed. The storage capacitor is a capacitor which is provided in parallel in the liquid crystal elements of each sub-pixel to hold the signal voltage.

In other words, in order to overcome the foregoing issue, the liquid crystal display device according to the present invention is an IPS active matrix type liquid crystal display device which is so characterized that: the scan signal wiring 1401 made with the first metal layer is formed on the TFT substrate 1431 as the first substrate (transparent insulating substrate); the gate insulating film 1403 is formed on the scan signal wiring 1401; the thin-film semiconductor layer 1405 and the video signal wiring 1401 as well as the source electrode 1406 made with the second metal layer are formed on the gate insulating film 1403; the passivation film 1407 as an inorganic insulating film is formed on the thin-film semiconductor layer 1405, the video signal wiring 1404, and the source electrode 1406; the flattening film 1408 is formed on the passivation film 1407; the common electrode 1410 and the pixel electrode 1409 made with a transparent conductive film are provided on an upper layer than the passivation film 1407; the pixel electrode 1409 is connected to the source electrode 1406 via the pixel electrode contact hole 1411; at least the black matrix 1420 as a light-shielding film and the columnar spacer 1415 for keeping the gap between the counter substrate 1432 and the TFT substrate 1431 are provided on the counter substrate 1432 as the second substrate (glass substrate); and the liquid crystal layer 1433 is sandwiched between the TFT substrate 1431 and the counter substrate 1432. Further, the liquid crystal display device according to the present invention is so characterized that: there is the recessed region 1414 on a part of the source electrode 1406 where the flattening film 1408 does not exist; and the common electrode 1410 covers the source electrode 1406 in the recessed region 1414 to form the second storage capacitor 1442.

Next, the basic structure of the present invention will be described in more details.

Figure 13A:
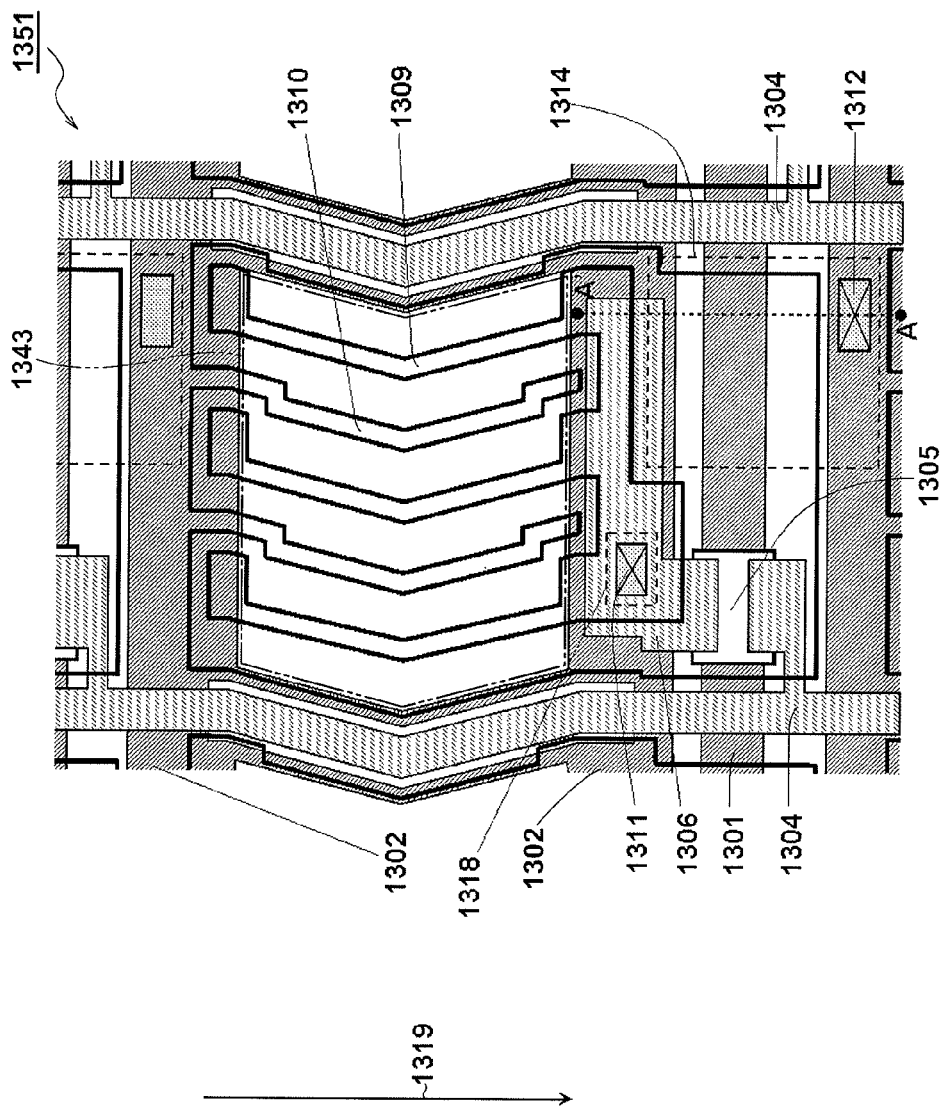
FIG. 13A is a plan view showing a sub-pixel of a liquid crystal display device according to a related technique, in which a columnar spacer is placed.
Figure 13B:
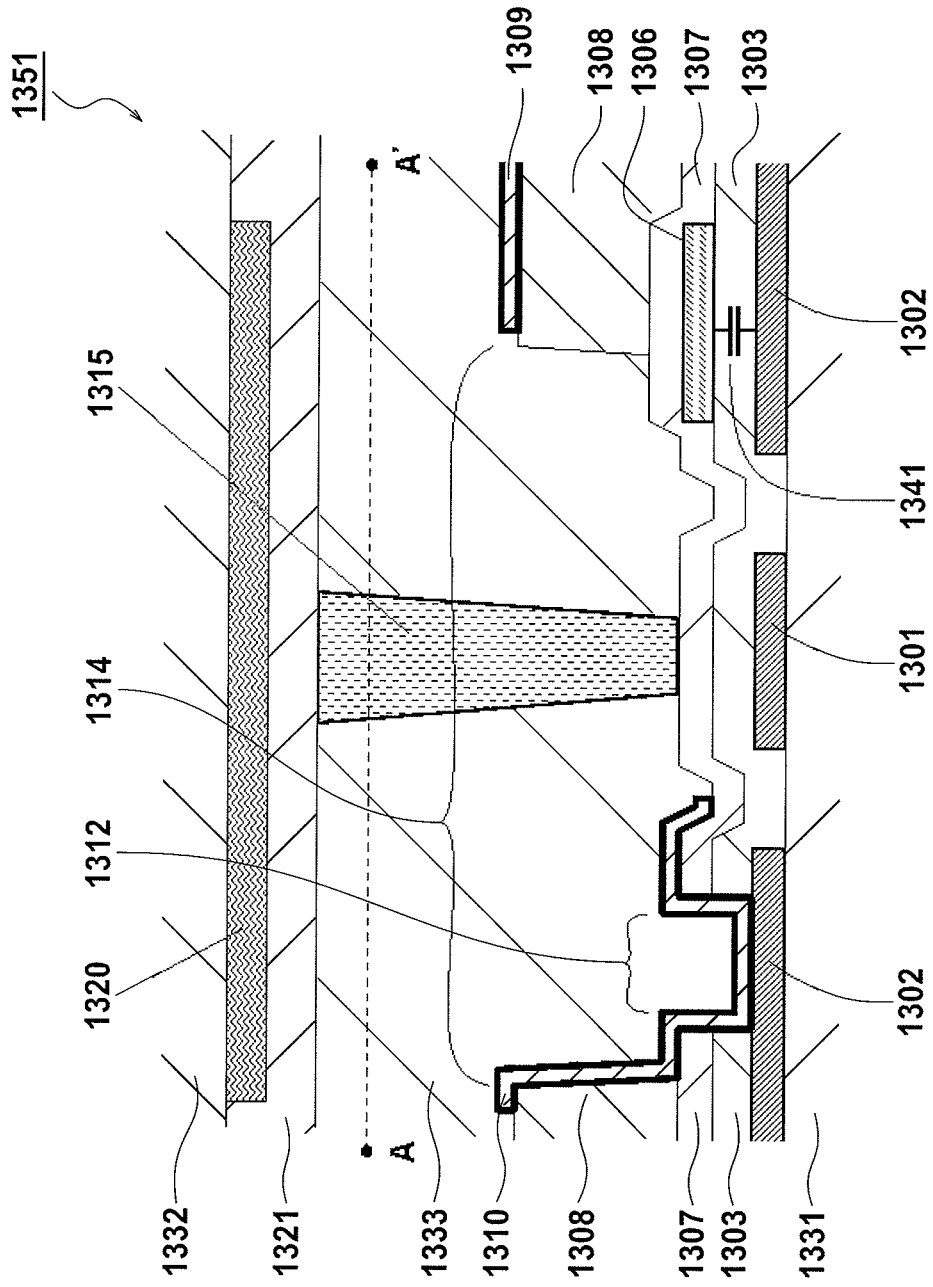
FIG. 13B is a sectional view taken along an A-A' part of FIG. 13A.

The basic structure of the present invention is shown in FIG. 14A and FIG. 14B. The first difference with respect to the related technique described in FIG. 13A and FIG. 13B is that the common electrode 1410 is overlapped on the above the source electrode 1406 in the recessed region 1414 where the flattening film 1408 does not exist. In addition to the first storage capacitor 1414 formed with the region where the common signal wiring 1402 and the source electrode 1406 are overlapped via the gate insulating film 1403, there is also provided the second capacitor 1442 that is formed with the region where the source electrode 1406 and the common electrode 1410 are overlapped via the passivation film 1407. The second storage capacitor 1442 can secure a larger capacitance with a smaller area compared to the case of the first storage capacitor 1441 (capable of increasing the storage capacitance with a same area).

Further, the recessed region 1414 having no flattening film 1408 above the second storage capacitor 1442 is unified with the part where the columnar spacer 1415 is placed and the peripheral region where the flattening film 1408 does not exist. Other than that, except for the vicinity of the pixel-electrode contact hole 1411 for connecting the pixel electrode 1409 and the source electrode 1406, the flattening film 1408 exists on the entire surface of the first sub-pixel 1451. Thereby, the second storage capacitor 1442 is formed by being overlapped on the first storage capacitor 1441, so that the area required for forming the storage capacitors can be decreased than the case of the related technique. This makes it possible to achieve a still higher numerical aperture.

The second difference with respect to the related technique is that the number of the common signal wiring 1402 per single sub-pixel is set to be only "1" which is located on the upper side of the scan signal wiring 1401 in the plane direction of FIG. 14A. Thereby, the region located in the lower side of the scan signal wiring 1401 in the plane direction of FIG. 14A can be utilized effectively. This makes it possible to achieve a still higher numerical aperture. Next, assuming that the basic structure of the present invention as the present invention 1, the present inventions 2 to 6 that are modification examples thereof will be described.

The present invention 2 is a modification of the present invention 1, which has a following structure. In the sub-pixels with the columnar spacer placed therein among the sub-pixels constituting a plurality of pixels, there is no flattening film in a region that supports the columnar spacer on the first substrate and there continues the region with no flattening film from that region to the region on the source electrode where there is no flattening film. In the region where there is no flattening film, the common electrode formed with the transparent conductive film covers the scan signal wiring, the source electrode, and the area between the both.

In the sub-pixel having the columnar spacer placed therein, there is no flattening film in the vicinity of the columnar spacer. Thus, it is possible to form the columnar spacers with a plurality of kinds of heights on the appearance through forming pedestals of the columnar spacers with a metal layer that forms a TFT array. This makes it easy to employ a structure which eases the trade-off between the friction force and the supporting force of the columnar spacers.

As described, the region in the vicinity of the columnar spacer where there is no flattening film and the region where there is no flattening film for forming the storage capacitor by a part of the source electrode are formed as the continuous region where there is no flattening film, so that such structure can be easily employed with a small area.

In the meantime, in a case where there is a wide region with no flattening film from the region in the vicinity of the scan line wiring for supporting the columnar spacer to the region on the source electrode for forming the storage capacitor, a leak electric field is generated from the scan signal wiring in those regions. As a result, the liquid crystal molecules are rotated in the vicinity of the scan signal wiring, and there is a possibility of causing a light leakage in all black display. When such light leakage occurs, the black luminance is increased. This results in deteriorating the contrast. Further, in the region between the scan signal wiring and the common signal wiring, the liquid crystal molecules are rotated due to the leak electric field from the scan signal wiring. Thus, when the screen is pushed by a finger in the all black display, the light-shielding layer formed on the color filter substrate may be shifted from a prescribed position. As a result, the light leakage in that area may be observed, and the light leakage may be generated when viewed from an oblique viewing field.

In the region where there is no flattening film, the scan signal wiring, the source electrode, and the area between the both are covered by using the common electrode formed by the transparent electrode. This makes it possible to suppress the electric field leaked from the scan signal wiring. Thereby, deterioration of the black display from the front and the oblique view fields caused due to the electric field leaked from the scan signal wiring can be suppressed.

The present invention 3 is a modification of the present inventions 1 and 2, which has a following structure in regards to the sub-pixel having no columnar spacer placed therein. The flattening film exists on the scan signal wiring. The flattening film does not exist only in the same area as the area where the flattening film is not provided on a part of the source electrode in the sub-pixel having the columnar spacer placed therein, and in the vicinity thereof. The scan signal wiring is not covered by the common electrode formed by the transparent conductive film. In the sub-pixel where there is no columnar spacer placed therein, the flattening film exists in the scan signal wiring. Thus, the leak of the electric field is weakened and suppressed by the flattening film. Therefore, it is unnecessary to cover the vicinity of the scan signal wiring by the common electrode. As a result, through employing the uncovering structure, the capacitance load of the scan signal wiring can be reduced, thereby making it possible to provide a fine display by suppressing delay of the scan signal wiring.

The present invention 4 is a modification of the present inventions 1 to 3, which has a following structure. The common electrode formed by the transparent conductive film is connected to the common signal wiring formed with a same metal layer as that of the scan signal wiring only in a specific sub-pixel via the common-electrode contact hole.

It is desirable to connect the common electrode formed by the transparent conductive film to the common signal wiring formed by a normal metal layer in order to suppress delay. However, it is not essential to connect the common electrode to the common signal wiring in all the sub-pixels. Through connecting the common electrode to the common signal wiring only in a specific sub-pixel, it is possible to achieve a high numerical aperture while securing the width of the scan line and the storage capacitor sufficiently.

The present invention 5 is a modification of the present invention 4, which has a following structure. The common electrode formed by the transparent conductive film is connected to the common signal wiring formed with a same metal layer as that of the scan signal wiring only in one of the specific sub-pixels having no columnar spacer.

Through this, the numerical aperture can be improved most efficiently.

The present invention 6 is a modification of the present invention 2, which has a following structure. The scan signal wiring is covered by the common electrode formed by the transparent conductive film in the sub-pixels where there is no columnar spacer placed therein. Through this, the electric field leaked from the scan signal wiring can be suppressed more securely even though the capacitance load of the scan signal wiring is increased. Thus, the black display can be more stabilized.

The IPS active matrix type liquid crystal display device according to the present invention can achieve the effects depicted below.

Regarding the sub-pixels where the columnar spacer is placed, the region of the periphery of the columnar spacer with no flattening film (overcoat) and the region in the second storage capacitor forming area on the source electrode with no flattening film are formed as a continuous region and the region from the above the scan signal wiring to the common signal wiring as well as the source electrode is covered by the common electrode. This makes it possible to block the electric field leaked from the scan signal wiring, so that the light leakage at the time of black display can be suppressed. Thereby, a wide region to the vicinity of the scan signal wiring can be secured as the aperture region. Therefore, a still higher numerical aperture can be achieved, and a higher contrast can be achieved since there is no light leakage at the time of black display. The present invention can provide a liquid crystal display device of a high picture quality suitable for high end use, which can achieve a high numerical aperture and a high contrast even in a type with a high definition and a narrow pitch.

Hereinafter, modes for embodying the present invention (referred to as "exemplary embodiments" hereinafter) will be described by referring to the accompanying drawings.

First Exemplary Embodiment

Figure 2B:
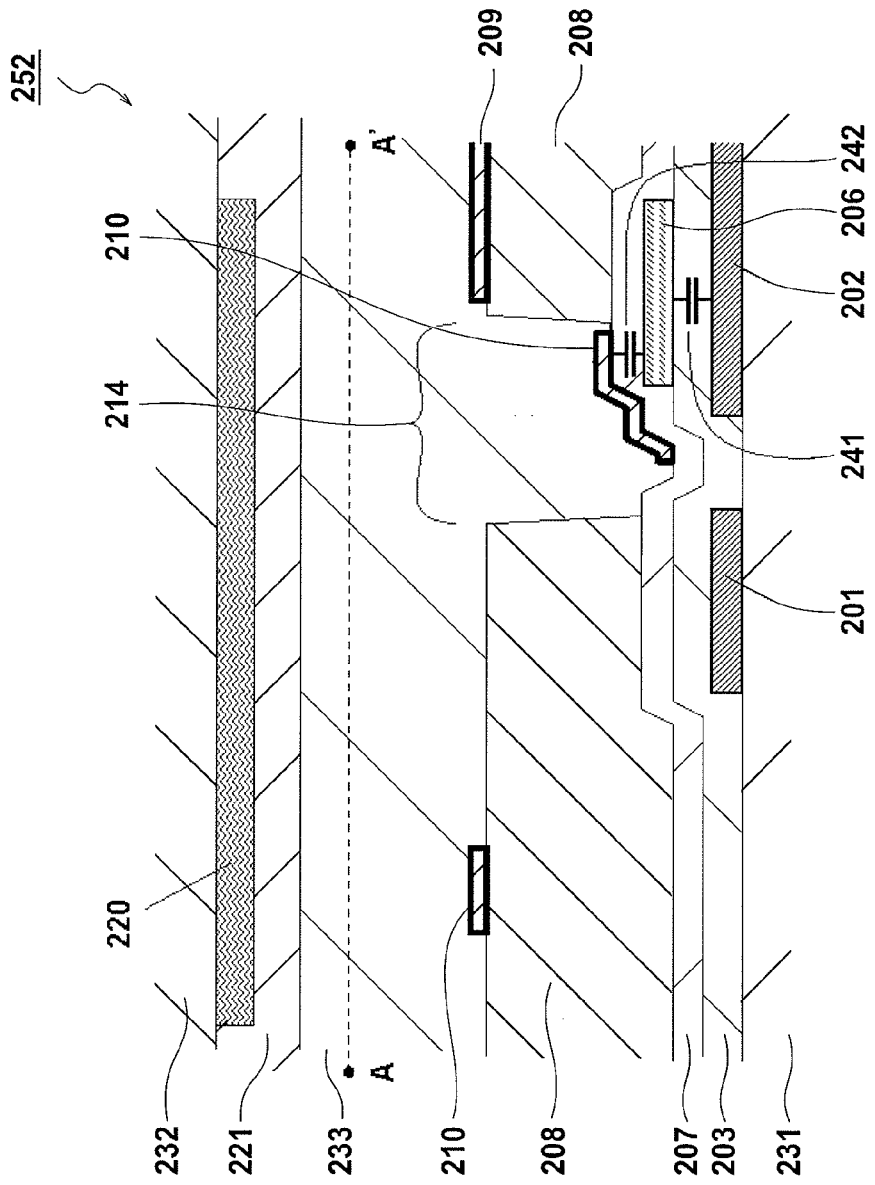
FIG. 2B is a sectional view taken along an A-A' part of FIG. 2A.
Figure 3A:
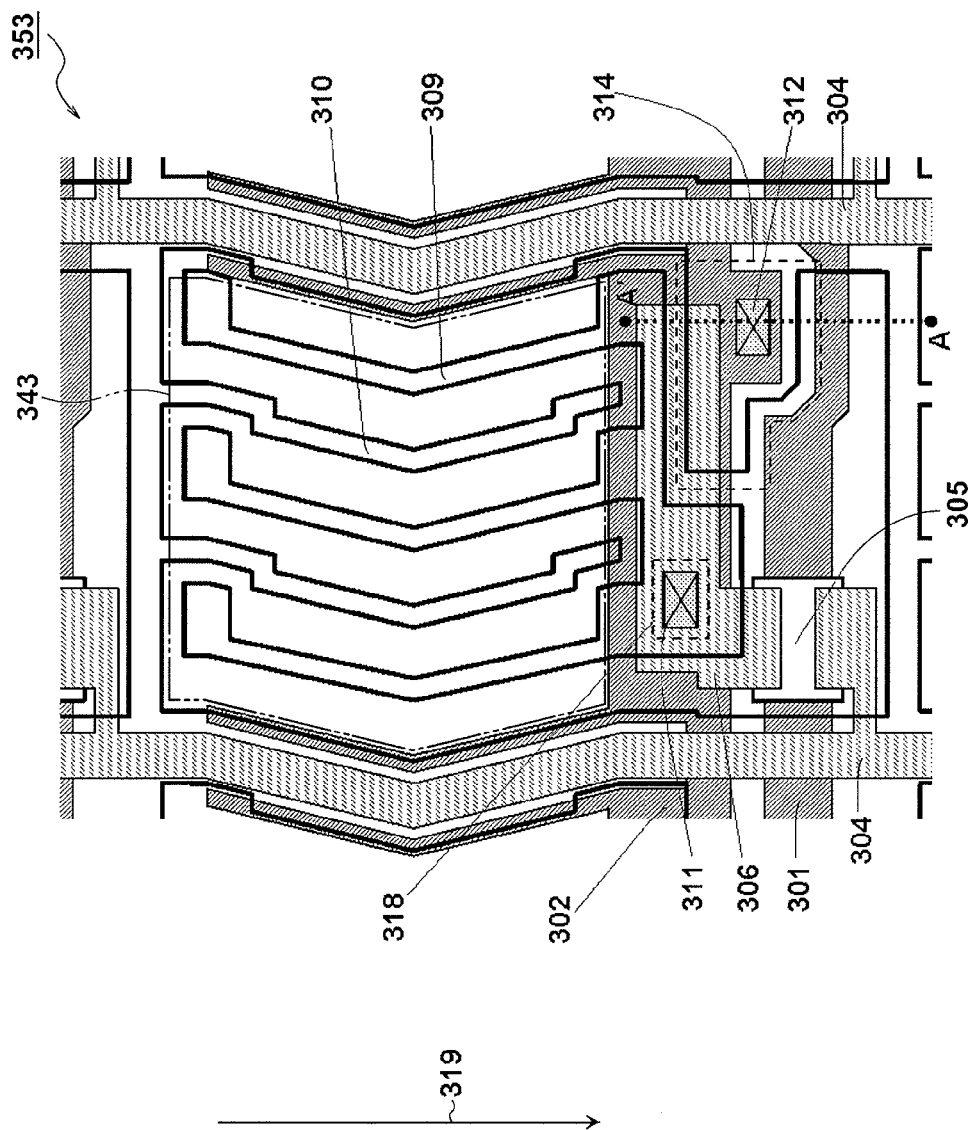
FIG. 3A is a plan view showing a sub-pixel of the liquid crystal display device according to the first exemplary embodiment, in which a columnar spacer is not placed and a common electrode contact hole for connecting a common signal wiring and a common electrode is provided.
Figure 3B:
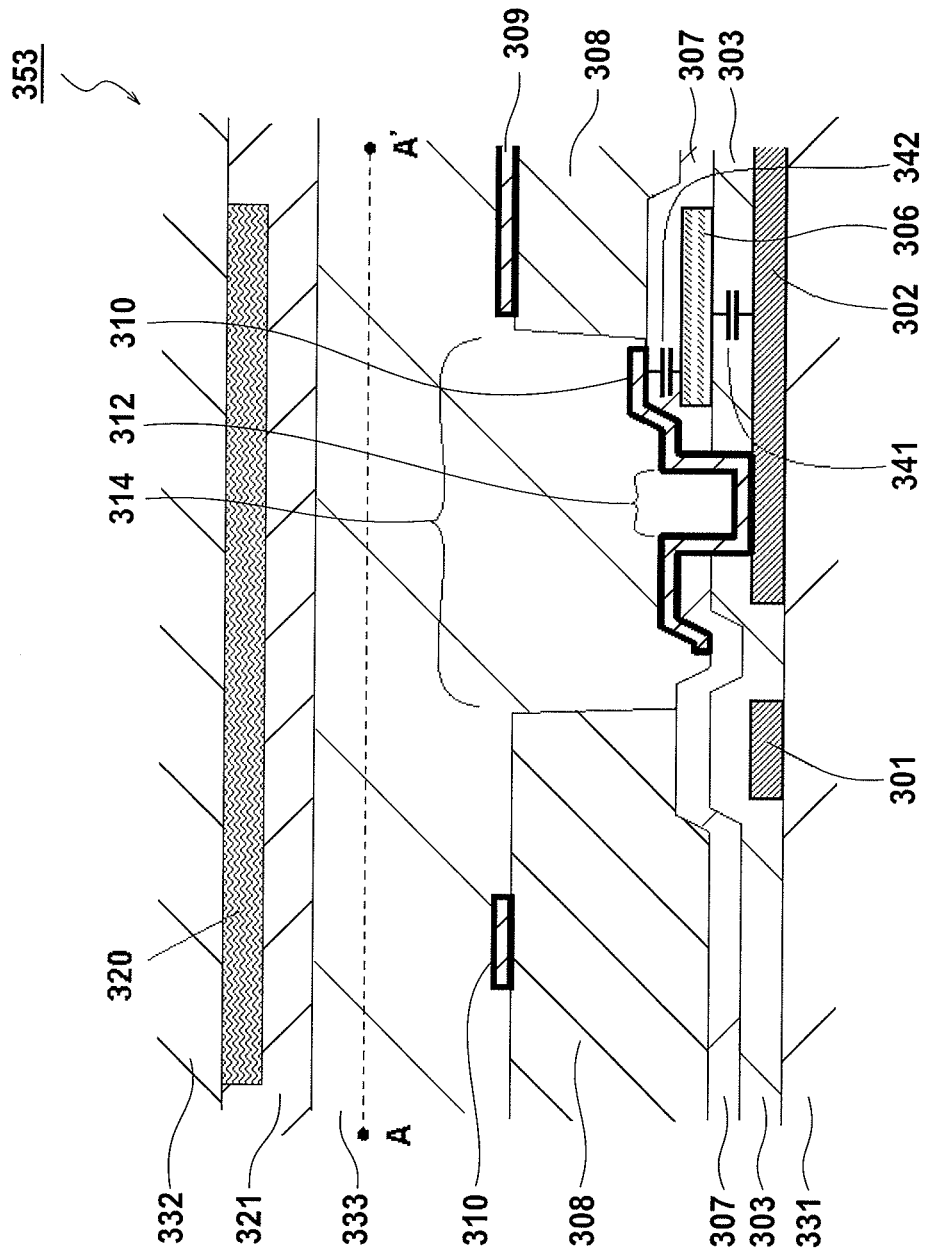
FIG. 3B is a sectional view taken along an A-A' part of FIG. 3A.
Figure 4:
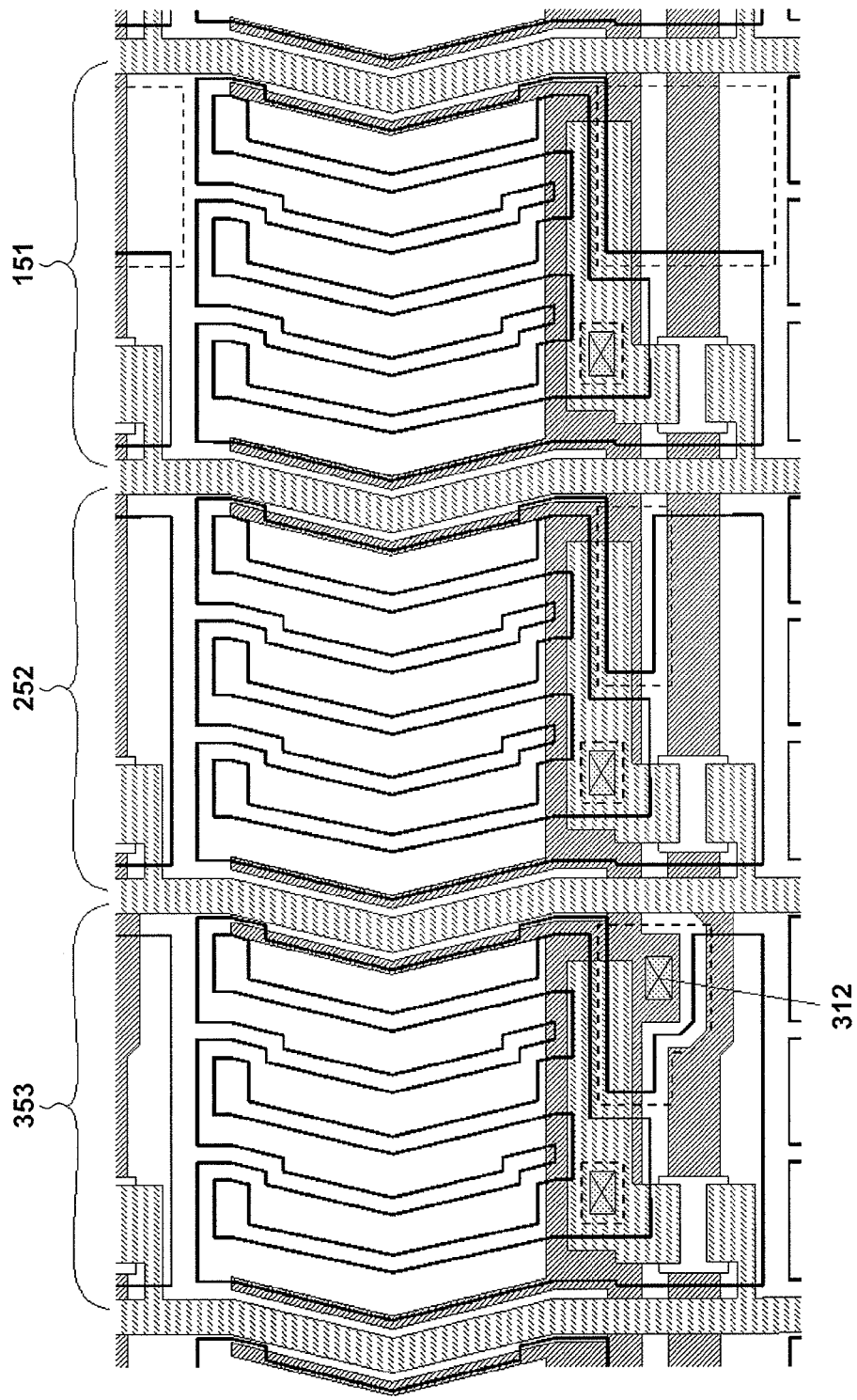
FIG. 4 is a plan view showing sub-pixels for one pixel of the liquid crystal display device according to the first exemplary embodiment, in which a common electrode contact hole for connecting a common signal wiring and a common electrode is provided.
Figure 5:
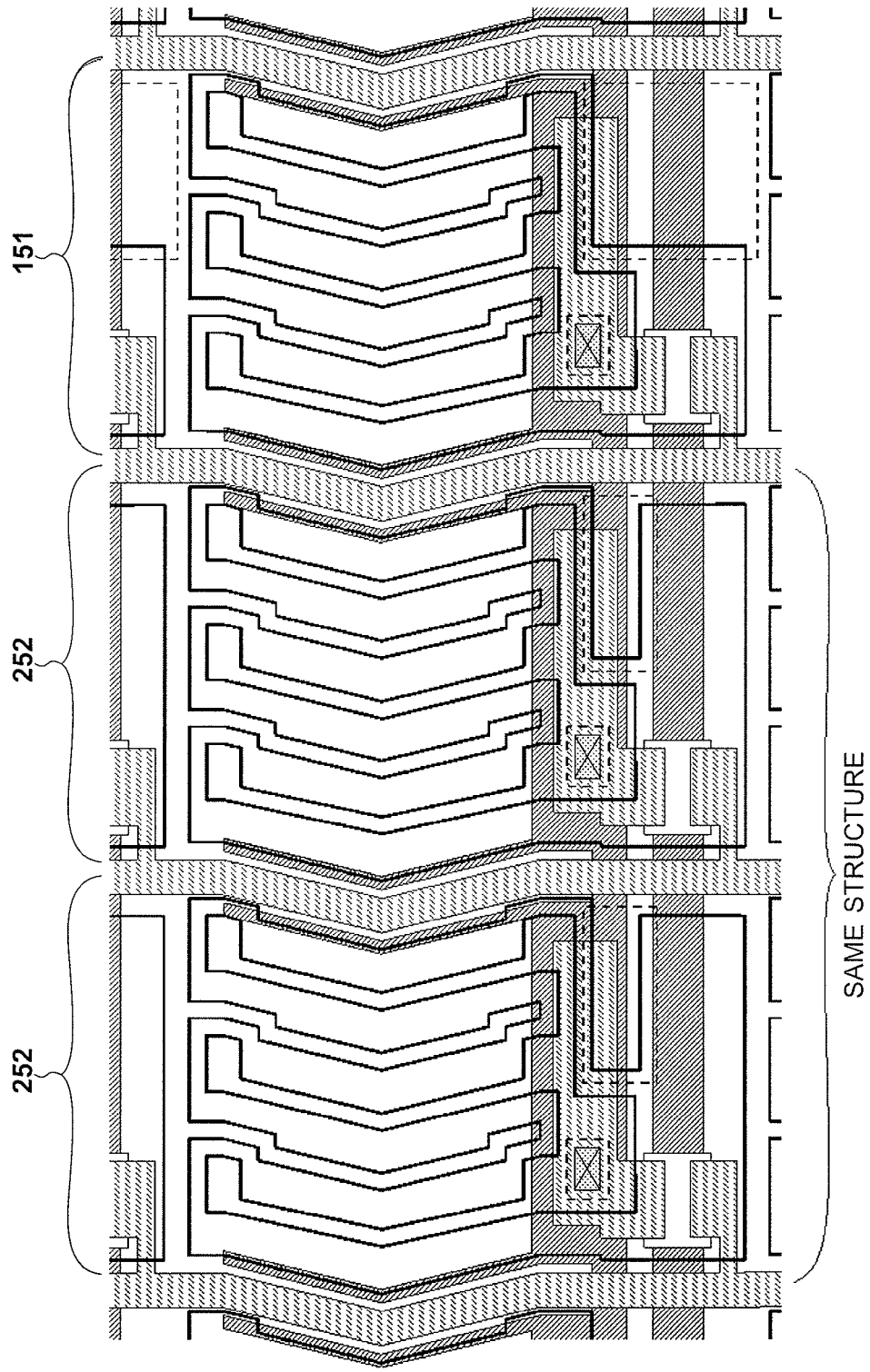
FIG. 5 is a plan view showing sub-pixels for one pixel of the liquid crystal display device according to the first exemplary embodiment, in which a common electrode contact hole for connecting a common signal wiring and a common electrode is not provided.

The first exemplary embodiment of the present invention will be described by referring to FIG. 1A, FIG. 1B, FIG. 2A, FIG. 2B, FIG. 3A, FIG. 3B, FIG. 4, and FIG. 5. FIG. 1A, FIG. 2A, and FIG. 3A are plan views showing a single sub-pixel of a liquid crystal display device according to the first exemplary embodiment. FIG. 1B, FIG. 2B, and FIG. 3B are sectional views of A-A' part of FIG. 1A, FIG. 2A, and FIG. 3A, respectively. FIG. 4 and FIG. 5 are plan views in which sub-pixels for a single pixel are arranged.

The liquid crystal display device according to the present invention includes: the TFT substrate 131; the counter substrate 132 provided by opposing to the TFT substrate 131; the liquid crystal layer 133 sandwiched between the counter substrate 132 and the TFT substrate 131; the scan signal wiring 101 and the common signal wiring 102 provided partially on the TFT substrate 131; the gate insulating film 103 as the first insulating film provided on the TFT substrate 131 including the scan signal wiring 101 and the common signal wiring 102; the source electrode 106 provided partially on the gate insulating film 103; the passivation film 107 as the second insulating film provided on the gate insulating film 103 including the source electrode 106; the flattening film 108 provided partially on the passivation film 107; the recessed region 114 formed with a region of the passivation film 107 where the flattening film 108 is not formed; the pixel electrode 109 made with a transparent conductive film provided partially on the flattening film 108 and electrically connected to the source electrode 106; the common electrode 110 made with a transparent conductive film provided partially on the flattening film 108 and on the passivation film 117 within the recessed region 114 and electrically connected to the common signal wiring 102; the first storage capacitor 141 formed with a structure in which the common signal wiring 102 and the source electrode 106 sandwich the gate insulating film 103; and the second storage capacitor 142 formed with a structure in which the common electrode 110 and the source electrode 106 sandwich the passivation film 107. The liquid crystal display device according to the present invention is an IPS liquid crystal display device which applies an electric field generated between the common electrode 110 and the pixel electrode 109 to the liquid crystal layer 133. Further, within the recessed region 114, the common electrode 110 covers the scan signal wiring 101 via the passivation film 107.

An alignment film (not shown) is formed on the surfaces of the TFT substrate 131 and the counter substrate 132. The alignment film on the TFT substrate 131 is rubbing-processed in the direction of 119 of the drawing, and the alignment film on the counter substrate 132 is rubbing-processed in the opposite direction of 119 of the drawing. The liquid crystal layer 133 inserted and sealed between the both substrates is homogeneously aligned in the direction of 119. A polarization plate (not shown) is pasted on the outer side of the both substrates. The polarization axis of the polarization plate on the outside of the TFT substrate 131 is designed to be orthogonal to the direction of 119, the polarization axis of the polarization plate on the outside of the counter substrate 132 is designed to be in parallel to the direction of 119, and the polarization axes of the both polarization plates are designed to be orthogonal to each other. The direction of the director of the liquid crystal is the direction of 119, which matches the direction of one of the polarization axes. Thereby, a normally-black state can be provided. The liquid crystal layer 133 can be designed as appropriate. However, as a way of example, it is so designed herein that the cell gap between the both substrates is 4.0 μm, the diffractive index anisotropy Δn=0.086, the dielectric constant anisotropy Δ∈=9. Further, it is so defined that the distance between the pixel electrode 109 and the common electrode 110 is 10 μm, and the width of each electrode is 3.5 μm.

The pixel electrode 109 and the common electrode 110 are both in a comb-like shape, and are formed to extend on the flattening film 108 substantially in parallel to each other. Each molecule of the liquid crystal layer 133 is rotated within the substrate surface by a transverse electric field almost in parallel to the both substrates applied between the pixel electrode 109 and the common electrode 110, and the display is controlled thereby. A potential difference of 0 V is applied between the both electrodes when displaying black, and 6 V is applied between the both electrodes when displaying white.

The alignment film of the display region (aperture part) 143 is formed on the flattening film 108. Thus, rubbing on the alignment film can be done uniformly, so that a fine black display can be acquired since there is no alignment disruption being generated. The recessed region 114 where no flattening film 108 is provided is a non-display region from the above the source electrode 106 to the scan signal wiring 101. Therefore, even if an alignment disruption is generated in that region, there is no influence at all imposed in terms of display. Hereinafter, the alignment processing on the TFT substrate as well as the counter substrate, the layout of the polarization plates on the outer side of the both substrates, and the property of the liquid crystal layer of the second to fourth exemplary embodiments are defined as the same as the case of the first exemplary embodiment unless it is specifically mentioned.

Next, details of the liquid crystal display device according to the first exemplary embodiment will be described. FIG. 1A and FIG. 1B show the sub-pixel according to the first exemplary embodiment in which the columnar spacer is placed. The sub-pixel shown in FIG. 1A and FIG. 1B is formed in a following manner.

The sub-pixel shown in FIG. 1A and FIG. 1B is the first sub-pixel 151 in which a columnar spacer 115 is placed. First, the scan signal wiring 101 and the common signal wiring 102 made with the first metal layer are formed. The first metal layer is formed by laminating an alloy having molybdenum as a main component and an alloy having aluminum as a main component. Then, as the first insulating film, a silicon nitride film to be the gate insulating film 103 is formed, and then the thin film semiconductor layer 105 is formed thereon.

Further, the video signal wiring 104 and the source electrode 106 (of the TFT) made with the second metal layer are formed. The second metal layer is formed by laminating an alloy having molybdenum as a main component and an alloy having aluminum as a main component.

An n-type semiconductor layer (not shown) is formed as a top layer of the thin film semiconductor layer 105. The n-type semiconductor layer is eliminated by dry etching after forming each electrode made with the second metal layer. That is, the n-type semiconductor layer only remains under the source electrode 106 and the drain electrode (a part of the video signal wiring 104). The TFT is constituted with a part in which the gate electrode (a part of the scan signal wiring 101), the gate insulating film 103, the thin-film semiconductor layer 105, the source electrode 106, and the drain electrode (a part of the video signal wiring 104) are laminated.

Further, as the second insulating film, the passivation film 107 made with a silicon nitride is formed thereon. Furthermore, a photosensitive acryl resin is applied thereon, and exposure, development, and calcination are performed thereon to form the flattening film 108 of a prescribed pattern. The flattening film 108 is formed to cover the entire display region (aperture part) 143 of the pixel, and the recessed regions 114 and 118 where no flattening film 108 is provided are formed in a part of the outside of the display region.

In the first sub-pixel 151 shown in FIG. 1A and FIG. 1B, the columnar spacer 115 is placed to abut against the position of the spacer supporting region 116 on the scan signal wiring 101.

The flattening film 108 in the recessed region 114 is continuously eliminated from the spacer supporting region 116 where the columnar spacer 115 is placed to the region over a part of the source electrode 106 that is electrically connected to the pixel electrode 109. Through eliminating the flattening film 108 continuously in this manner, the organic film eliminated part from the region on the scan signal wiring 101 to the region on the source electrode 106 can be formed with a still smaller area. Thus, the display region 143 can be secured still wider, so that a higher numerical aperture can be achieved.

The recessed region 118 in which the flattening film 108 is eliminated uncontinuously from the recessed region 114 is formed on the source electrode 106. The pixel-electrode contact hole 111 for connecting the source electrode 106 and the pixel electrode 109 is formed within the recessed region 118.

Then, the pixel electrode 109 and the common electrode 110 are formed by using a transparent conductive film such as ITO (Indium Tin Oxide). The common electrode 110 is formed to cover the video signal wiring 104 to shield the electric field from the video signal wiring 104.

This makes it possible to widen the display region 143, so that a high numerical aperture can be achieved. The pixel electrode 109 is connected to the source electrode 106 via the pixel-electrode contact hole 111. In general, a same voltage is applied to all the common electrodes 110 of each of the sub-pixels, and different voltages are applied to the pixel electrodes 109 of each of the sub-pixels.

As shown in FIG. 1B, the second capacitor 142 is formed within the recessed region 114 by placing the common electrode 110 on a part of the source electrode 106 via the passivation film 107. Thus, it becomes possible to form the equivalent storage capacitors with a still smaller area compared to the case where only the first storage capacitor 141 is formed between the source electrode 106 and the common signal wiring 102.

In the recessed region 114, the common electrode 110 covers the scan signal wiring 101, the source electrode 106, and the area between the scan signal wiring 101 and the source electrode 106 via the passivation film 107 that is formed by the second insulating film. Thereby, the electric field leaked from the scan signal wiring 101 can be shielded, and the light leakage at the time of black display can be suppressed.

Among a plurality of sub-pixels constituting a single pixel, there is provided only one or less sub-pixel in which the columnar spacer is placed. Regarding the sub-pixels in which the columnar spacer 115 is placed, the sub-pixel in which the pedestal 117 as shown in FIG. 1A and FIG. 1B is placed and the sub-pixel in which the pedestal 117 is not placed (not shown) are provided depending on the pixels. In the sub-pixel 151 in which the pedestal 117 and the columnar spacer 115 are placed, the columnar spacer 115 and the pedestal 117 contact with each other to support the load of the gap between the TFT substrate 131 and the counter substrate (color filter substrate) 132. The columnar spacer 151 which supports the load in a normal state by placing the pedestal 117 is referred to as a "main column" hereinafter.

In the meantime, among the sub-pixels in which the columnar spacer 115 is placed, the sub-pixel in which the pedestal 117 is not placed works as described below. In a case where a large load is not imposed upon the TFT substrate 131 and the counter substrate 132, there is almost no load imposed upon the columnar spacer 115. Thus, a frictional resistance is generated to apply a stress in the counter substrate 132 when the gap between the TFT substrate 131 and the counter substrate 132 becomes narrow, so that fuzziness in black display is not generated. In the meantime, in a case where a large load is not imposed upon the TFT substrate 131 and the counter substrate 132, the columnar spacer 115 abuts against the TFT substrate 131 to bear the load to prevent the columnar spacer 115 in the sub-pixel having the pedestal 117 from being plastic-deformed by an excessive force. As described, the columnar spacer 115 in the sub-pixel having no pedestal 117 has a function to support the columnar spacer 115 (main column) of the sub-pixel having the pedestal 117 only when a large load is applied. Such columnar spacer is referred to as an "auxiliary column" hereinafter.

Through eliminating the flattening film 108 of the spacer supporting region 116 in advance, the pedestal 117 can be formed with the second metal layer or the like simultaneously with the source electrode 106. Thus, it is desirable for the flattening film 108 not to be provided in the vicinity of the region where the columnar spacer 115 is to be placed. Further, it is desirable not to provide the common-electrode contact hole 111 for connecting the common signal wiring 102 and the common electrode 110 in the sub-pixel 151 where the columnar spacer 115 is placed.

Further, on the counter substrate (color filter substrate) 132, the black matrix 120 is formed by using a resin black at a position corresponding to the scan signal wiring 101 and the video signal wiring 104. A color layer (not shown) is provided in the display region on the black matrix 120, and the overcoat 121 is formed thereon.

FIG. 2A is a plan view showing a sub-pixel according to the first exemplary embodiment in which the columnar spacer is not placed.

The sub-pixel shown in FIG. 2A and FIG. 2B is the sub-pixel 252 in which the columnar spacer 115 is not placed. Unlike the case of FIG. 1A and FIG. 1B, the recessed region 214 having no flattening film 208 is only the forming part of the second storage capacitor 242 on the source electrode 206. That is, in the area corresponding to the spacer supporting region 116 of FIG. 1A and FIG. 1B, the flattening film 208 exists. Further, the common electrode 210 of A-A' part is formed only within the recessed region 214 having no flattening film 208 on the source electrode 206, and it is not placed to shield the region from the scan signal wiring 201 to the common signal wiring 202.

The flattening film (overcoat film) 208 remains on the scan signal wiring 201. Thereby, the electric field leaked from the scan signal wiring 201 can be weakened even though the scan signal wiring 201 is not shielded by the common electrode 210.

FIG. 3A is a plan view showing a sub-pixel according to the first exemplary embodiment in which the columnar spacer is not placed and the common-electrode contact hole for connecting the common signal wiring and the common electrode is provided.

The sub-pixel shown in FIG. 3A and FIG. 3B is the sub-pixel 353 in which the columnar spacer is not placed and the common-electrode contact hole 312 for connecting the common signal wiring 302 and the common electrode 310 is provided. The difference with respect to the sub-pixel shown in FIG. 2A and FIG. 2B is that the recessed region 314 having no flattening film 308 is widened for providing the common-electrode contact hole 312. The sub-pixel 353 is also a sub-pixel in which the columnar spacer is not placed, so that the region from the scan signal wiring 301 to the common signal wiring 302 is not shielded by the common electrode 310 as in the case of the sub-pixel 252 shown in FIG. 2A and FIG. 2B. Since the flattening film 308 remains on the scan signal wiring 301, there is an effect of weakening the electric field leaked from the scan signal wiring 301 even though it is not shielded by the common electrode 310. FIG. 4 and FIG. 5 are plan views in which the sub-pixels for a single pixel according to the first exemplary embodiment are arranged.

The single pixel shown in FIG. 4 is constituted with: the sub-pixel 151 in which the columnar spacer 115 is placed; the sub-pixel 252 in which the columnar spacer is not placed and the common-electrode contact hole is not provided; and the sub-pixel 353 in which the columnar spacer is not placed and the common-electrode contact hole 312 is provided. The sub-pixel 151 corresponds to a color filter of blue (B), the sub-pixel 252 corresponds to a color filter of green (G), and the sub-pixel 353 corresponds to a color filter of red (R). As described, it is sufficient to provide a single sub-pixel in which the common-electrode contact hole is provided out of the three sub-pixels within a single pixel.

Further, depending on the pixel, as shown in FIG. 5, the sub-pixel 252 in which the common-electrode contact hole is not provided may be placed instead of the sub-pixel 353 in which the common-electrode contact hole 312 is provided. That is, the single pixel shown in FIG. 5 is constituted with the sub-pixel 151 in which the columnar spacer 115 is placed and the two sub-pixels 252 in which the columnar spacer is not placed and the common-electrode contact hole is not provided.

The common electrodes 110, 210, and 310 (FIG. 1A, FIG. 2A, FIG. 3A) are connected to each other in the neighboring pixels and are formed by the transparent conductive films such as ITO. Thus, the common electrodes are of sufficiently low resistance for stabilizing the potentials of the common electrodes over a plurality of pixels. Thus, it is possible to decrease the occurrence probability of faults such as short circuits between the wirings through not providing more than the necessary number of contact holes. Thus, it is desirable to set the number of the sub-pixels in which the common-electrode contact hole is provided to be $1/3$ or less of the number of total sub-pixels of the entire pixels.

One each of the columnar spacer may be placed in all the pixels or may be placed in $1/2$ to $1/8$ of the entire pixels, for example. In a case where the columnar spacer is placed in all the pixels, the pixel shown in FIG. 4 and the pixel shown in FIG. 5 may be placed in a prescribed ratio. In a case where the columnar spacer is placed in $1/2$ to $1/8$ of the entire pixels, the pixel having no columnar spacer may be formed in a structure in which the sub-pixel 151 is provided on the TFT substrate side and no columnar spacer is provided on the counter substrate side as shown in FIG. 4 and FIG. 5 or may be formed in a structure in which the sub-pixel 151 shown in FIG. 4 and FIG. 5 is replaced with the sub-pixel 252.

In Example 1 of the first exemplary embodiment, the columnar spacer was placed in all the pixels, and the pixel shown in FIG. 4 was used for all the pixels. Among the sub-pixels 151 in which the columnar spacer was placed, the proportion of the sub-pixel in which the pedestal 117 was placed and the sub-pixel in which the pedestal 117 was not placed was set to be 1:15.

Thereby, among the entire pixels, the main column was placed in $1/16$ of the pixels, and the auxiliary column was placed in $15/16$ of the pixels. Through reducing the density of the main columns as in this case, faults such as fuzziness of black display caused due to a stress generated by shifts between the both substrates were able to be suppressed, thereby making it possible to acquire a fine display. Further, the number of the sub-pixels 353 having the common-electrode contact hole was $1/3$ of the entire sub-pixels. Through setting the proportion thereof to be $1/3$ or less, a sufficiently fine yield was able to be achieved.

In Example 2 of the first exemplary embodiment, the columnar spacer was placed in $1/4$ of the entire pixels, and the proportion of the pixel shown in FIG. 4 and the pixel shown in FIG. 5 was set to be 1:3. Among the sub-pixels 151 in which the columnar spacer was placed, the proportion of the sub-pixel in which the pedestal 117 was placed and the sub-pixel in which the pedestal 117 was not placed was set to be 1:3. Thereby, among the entire pixels, the main column was placed in $1/16$ of the pixels, and the auxiliary column was placed in $3/16$ of the remaing pixels. Through reducing the number of auxiliary columns compared to that of Example 1, the alignment failure in the vicinity of the columnar spacer can be reduced, the contrast can be improved, and a still finer display can be acquired even though the load resistance is slightly deteriorated. Further, the number of the sub-pixels 353 having the common-electrode contact hole 312 was $1/12$ of the entire sub-pixels, and the proportion thereof was $1/3$ or less. Thereby, a sufficiently fine yield was able to be achieved. While the number of the main columns is set to be $1/16$ of the entire pixels in the cases described above, it is possible to set the number as appropriate within a range of $1/4$ to $1/48$. Further, the density of the auxiliary columns in which the pedestal 117 is not placed can be set as appropriate depending on the balance between the black display quality and the load resistance. Further, in a case of a small-type in which there is a sufficient margin in signal writing, for example, the entire pixels may be arranged as in FIG. 5 without providing the common-electrode contact hole.

The first exemplary embodiment will be described by returning to FIG. 1A and FIG. 1B. The alignment film (not shown) is formed on the TFT array substrate 131 and the counter substrate 132 formed as described above. After rubbing processing is performed in the rubbing direction 119, the both substrates are laminated, the liquid crystal layer 133 is inserted between the both substrates, and the both substrates are sealed.

Through employing such structure, the first exemplary embodiment makes it possible to secure the wide region to the vicinity of the scan signal line as the aperture region, to achieve a higher numerical aperture, and to prevent the light leakage at the time of black display. Thus, a high contrast can be achieved.

As an exemplary advantage according to the invention, a new storage capacitor is achieved by superimposing the common electrode on the source electrode via the insulating film. This makes it possible to secure a large storage capacitor without deteriorating the numerical aperture, i.e., with a small area, since the common electrode is formed with the transparent conductive film.

(Second Exemplary Embodiment)

Figure 6A:
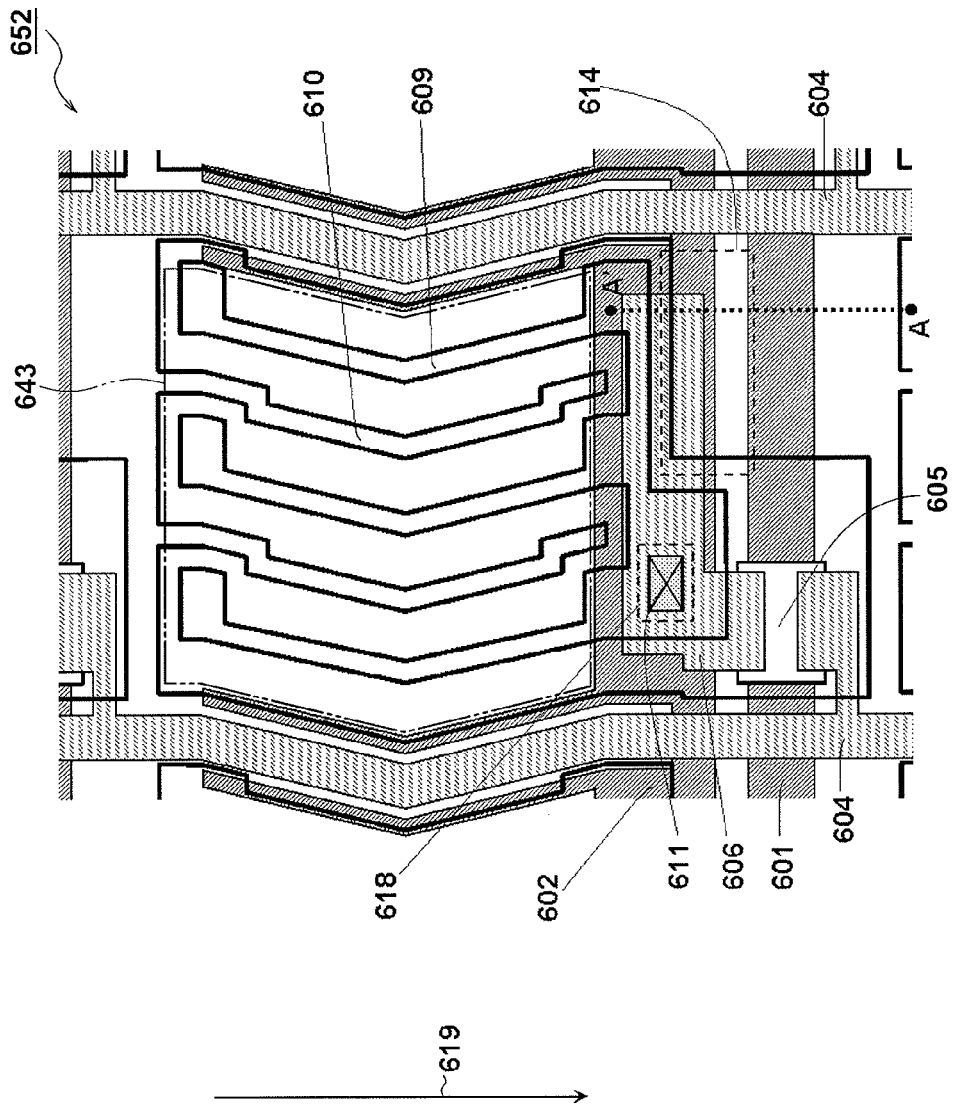
FIG. 6A is a plan view showing a sub-pixel of a liquid crystal display device according to a second exemplary embodiment, in which a columnar spacer is not placed.
Figure 7A:
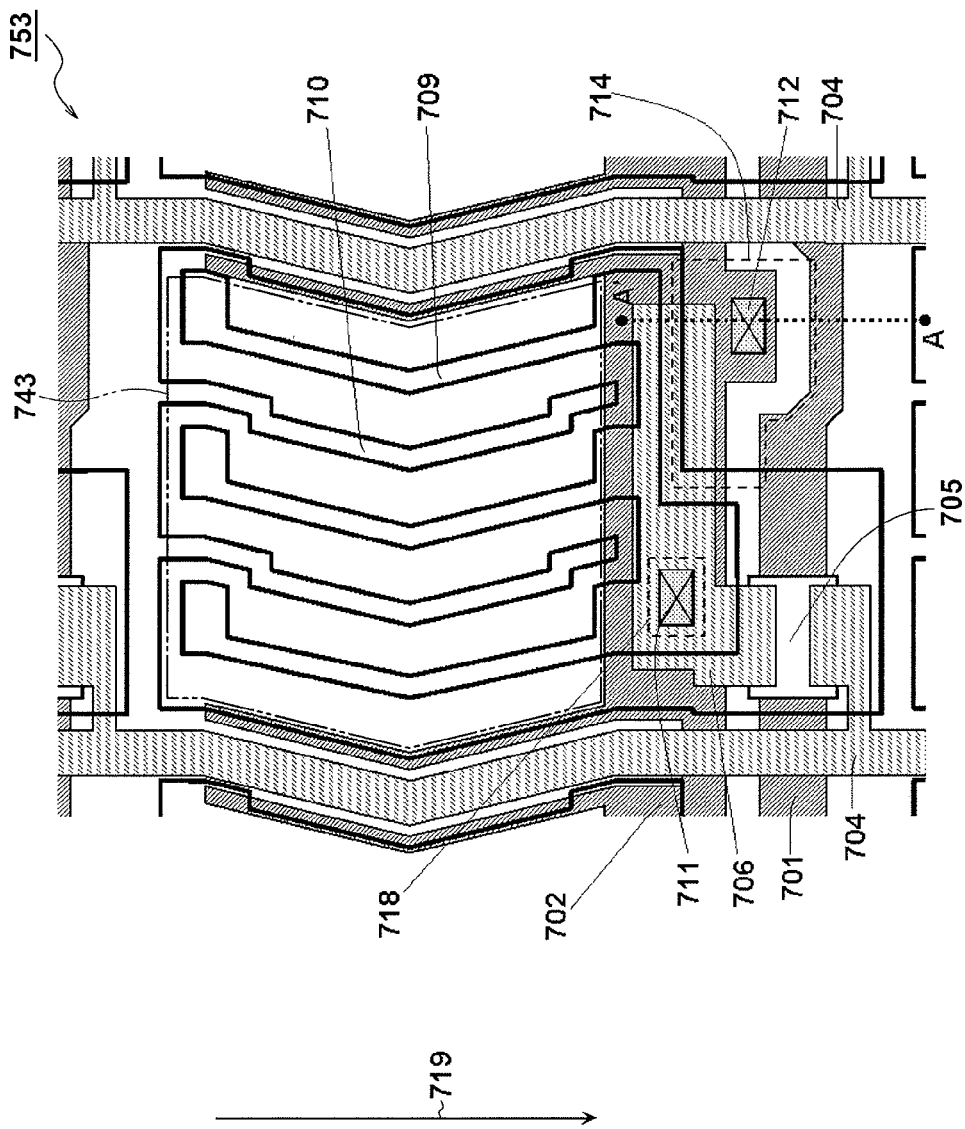
FIG. 7A is a plan view showing a sub-pixel of the liquid crystal display device according to the second exemplary embodiment, in which a columnar spacer is not placed and a common electrode contact hole for connecting a common signal wiring and a common electrode is provided.
Figure 8:
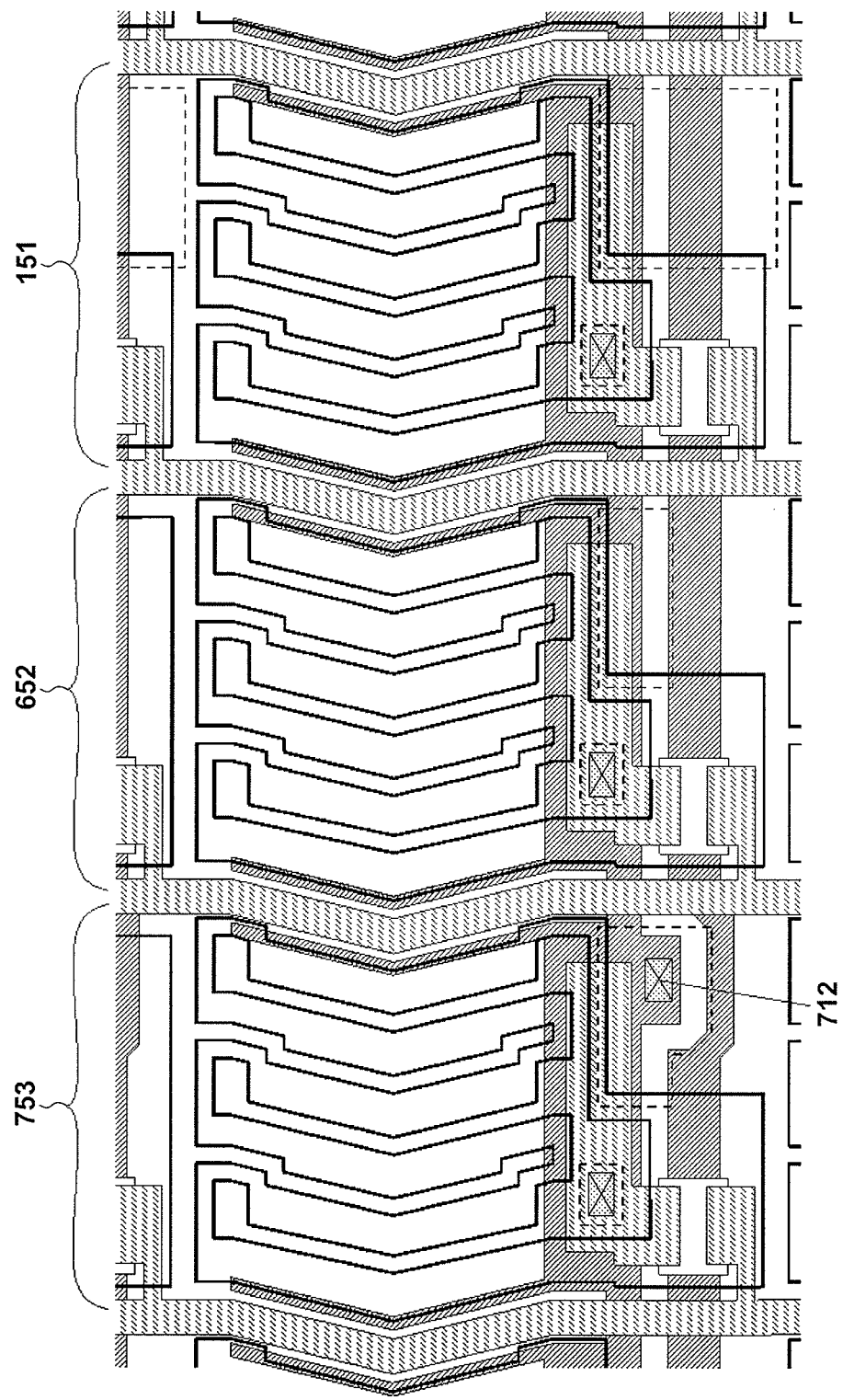
FIG. 8 is a plan view showing sub-pixels for one pixel of the liquid crystal display device according to the second exemplary embodiment, in which a common electrode contact hole for connecting a common signal wiring and a common electrode is provided.

The second exemplary embodiment of the present invention will be described by referring to FIG. 6A, FIG. 6B, FIG. 7A, FIG. 7B, FIG. 8, and FIG. 9. FIG. 6A and FIG. 7A are plan views showing a single sub-pixel of a liquid crystal display device according to the second exemplary embodiment. FIG. 6B and FIG. 7B are sectional views of A-A' part of FIG. 6A and FIG. 7A, respectively. FIG. 8 and FIG. 9 are plan views in which sub-pixels for a single pixel are arranged.

The sub-pixel according to the second exemplary embodiment in which the columnar spacer is placed is the same as the sub-pixel (FIG. 1A and FIG. 1B) of the first exemplary embodiment. FIG. 6A and FIG. 6B show the sub-pixel 652 according to the second exemplary embodiment in which the columnar spacer is not placed. The difference of the sub-pixel 652 with respect to the sub-pixel 252 (FIG. 2A and FIG. 2B) of the first exemplary embodiment is that the region from the scan signal wiring 601 to the common signal wiring 602 is shielded by the common electrode 610. Thereby, the electric field leaked from the scan signal wiring 601 can be shielded.

FIG. 7A and FIG. 7B show the sub-pixel 753 according to the second exemplary embodiment in which the columnar spacer is not placed and the common-electrode contact hole is provided. The difference of the sub-pixel 753 with respect to the sub-pixel 353 (FIG. 3A and FIG. 3B) of the second exemplary embodiment is that the region from the scan signal wiring 701 to the common signal wiring 702 is shielded by the common electrode 710. Thereby, the electric field leaked from the scan signal wiring 701 can be shielded.

FIG. 8 and FIG. 9 are plan views in which the sub-pixels for a single pixel according to the second exemplary embodiment are arranged.

The single pixel shown in FIG. 8 is constituted with: the sub-pixel 151 in which the columnar spacer 115 is placed; the sub-pixel 652 in which the columnar spacer is not placed and the common-electrode contact hole of the common electrode 610 is not provided; and the sub-pixel 753 in which the columnar spacer is not placed and the common-electrode contact hole 712 of the common electrode 710 is provided. The sub-pixel 151 corresponds to a color filter of blue (B), the sub-pixel 652 corresponds to a color filter of green (G), and the sub-pixel 753 corresponds to a color filter of red (R). As described, it is sufficient to provide a single sub-pixel in which the common-electrode contact hole is provided out of the three sub-pixels within a single pixel.

Further, depending on the pixel, as shown in FIG. 9, the sub-pixel 652 in which the common-electrode contact hole is not provided may be placed instead of the sub-pixel 753 in which the common-electrode contact hole 712 is provided. That is, the single pixel shown in FIG. 9 is constituted with the sub-pixel 151 in which the columnar spacer 115 is placed and the two sub-pixels 652 in which the columnar spacer is not placed and the common-electrode contact hole of the common electrode 610 is not provided.

The common electrodes 110, 610, and 710 (FIG. 1A, FIG. 6A, FIG. 7A) are connected to each other in the neighboring pixels and are formed by the transparent conductive films such as ITO. Thus, the common electrodes are of sufficiently low resistance for stabilizing the potentials of the common electrodes over a plurality of pixels. Thus, it is possible to decrease the occurrence probability of faults such as short circuits between the wirings through not providing more than the necessary number of contact holes. Thus, it is desirable to set the number of the sub-pixels in which the common-electrode contact hole is provided to be ⅓ or less of the number of total sub-pixels of the entire pixels.

One each of the columnar spacer may be placed in all the pixels or may be placed in ½ to ⅛ of the entire pixels, for example. In a case where the columnar spacer is placed in all the pixels, the pixel shown in FIG. 8 and the pixel shown in FIG. 9 may be placed in a prescribed ratio. In a case where the columnar spacer is placed in ½ to ⅛ of the entire pixels, the pixel having no columnar spacer may be formed in a structure in which the sub-pixel 151 shown in FIG. 8 or FIG. 9 is provided on the TFT substrate side and no columnar spacer is provided on the counter substrate side or may be formed in a structure in which the sub-pixel 151 shown in FIG. 8 or FIG. 9 is replaced with the sub-pixel 652.

In Example 1 of the second exemplary embodiment, the columnar spacer was placed in all the pixels, and the pixel shown in FIG. 8 was used for all the pixels. Among the sub-pixels 151 in which the columnar spacer is placed, the proportion of the sub-pixel in which the pedestal 117 was placed and the sub-pixel in which the pedestal 117 was not placed was set to be 1:15.

Thereby, among the entire pixels, the main column was placed in 1/16 of the pixels, and the auxiliary column was placed in 15/16 of the pixels. Through reducing the density of the main columns as in this case, faults such as fuzziness of black display caused due to a stress generated by shifts between the both substrates were able to be suppressed, thereby making it possible to acquire a fine display. Further, the number of the sub-pixels 753 having the common-electrode contact hole was ⅓ of the entire sub-pixels. Through setting the proportion thereof to be ⅓ or less, a sufficiently fine yield was able to be achieved.

In Example 2 of the second exemplary embodiment, the columnar spacer was placed in ¼ of the entire pixels, and the proportion of the pixel shown in FIG. 8 and the pixel shown in FIG. 9 was set to be 1:3. Among the sub-pixels 151 in which the columnar spacer was placed, the proportion of the sub-pixel in which the pedestal 117 was placed and the sub-pixel in which the pedestal 117 was not placed was set to be 1:3. Thereby, among the entire pixels, the main column was placed in 1/16 of the pixels, and the auxiliary column was placed in 3/16 of the remaining pixels. Through reducing the number of auxiliary columns compared to that of Example 1, the alignment failure in the vicinity of the columnar spacer can be reduced, the contrast can be improved, and a still finer display can be acquired even though the load resistance is slightly deteriorated. Further, the number of the sub-pixels 753 having the common-electrode contact hole was 1/12 of the entire sub-pixels, and the proportion thereof was ⅓ or less. Thereby, a sufficiently fine yield was able to be achieved. While the number of the main columns is set to be 1/16 of the entire pixels in the cases described above, it is possible to set the number as appropriate within a range of ¼ to 1/48. Further, the density of the auxiliary columns in which the pedestal 117 is not placed can be set as appropriate depending on the balance between the black display quality and the load resistance. Further, in a case of a small-type in which there is a sufficient margin in signal writing, for example, the entire pixels may be arranged as in FIG. 9 without providing the common-electrode contact hole.

In the second exemplary embodiment, the scan signal wirings of all the pixels are shielded by the common electrodes. Such structure makes it possible to secure the wide region to the vicinity of the scan signal line as the aperture region, to achieve a higher numerical aperture, and to prevent the light leakage at the time of black display. Thus, a high contrast can be achieved.

(Third Exemplary Embodiment)

Figure 10B:
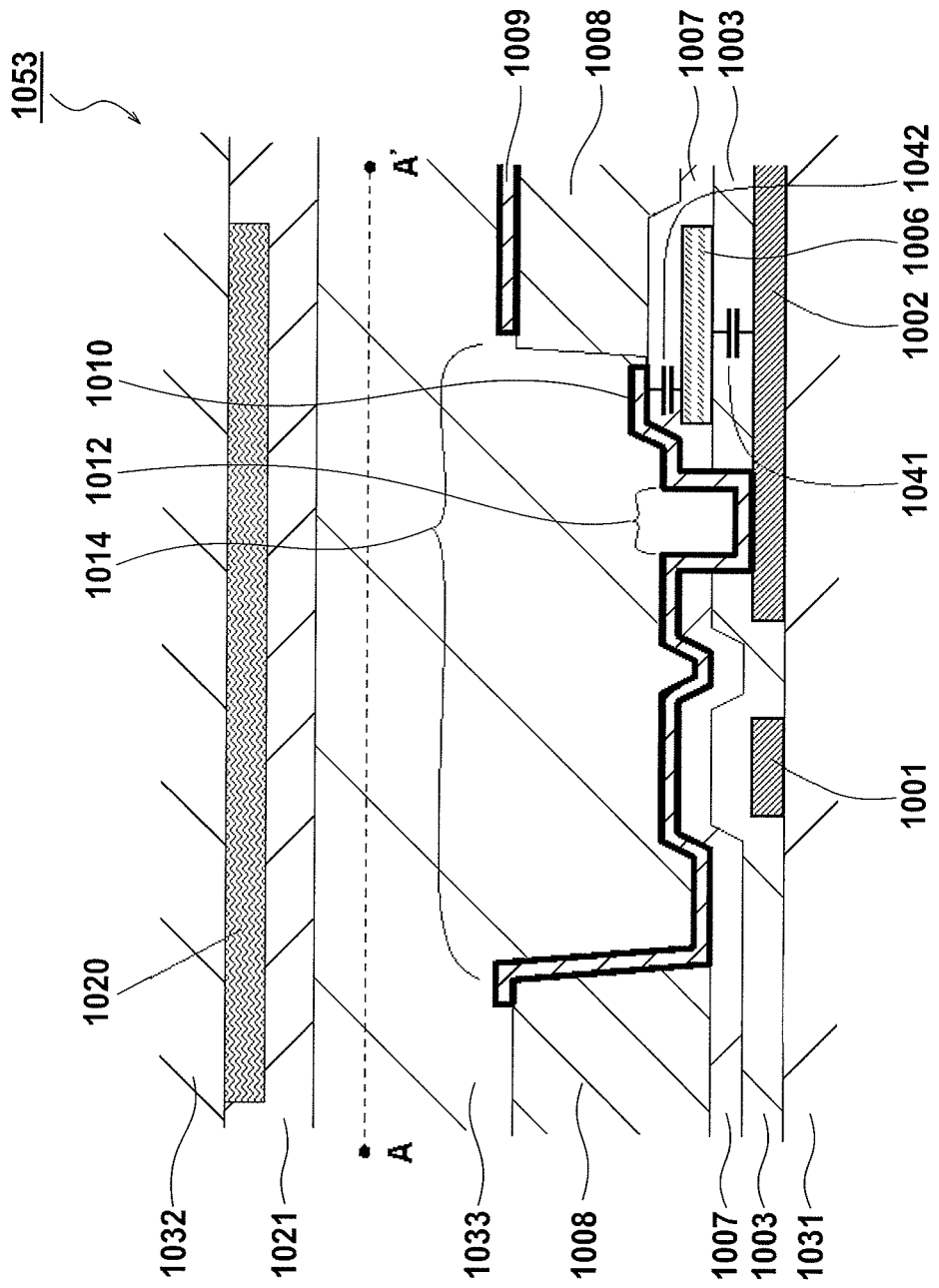
FIG. 10B is a sectional view taken along an A-A' part of FIG. 10A.
Figure 11:
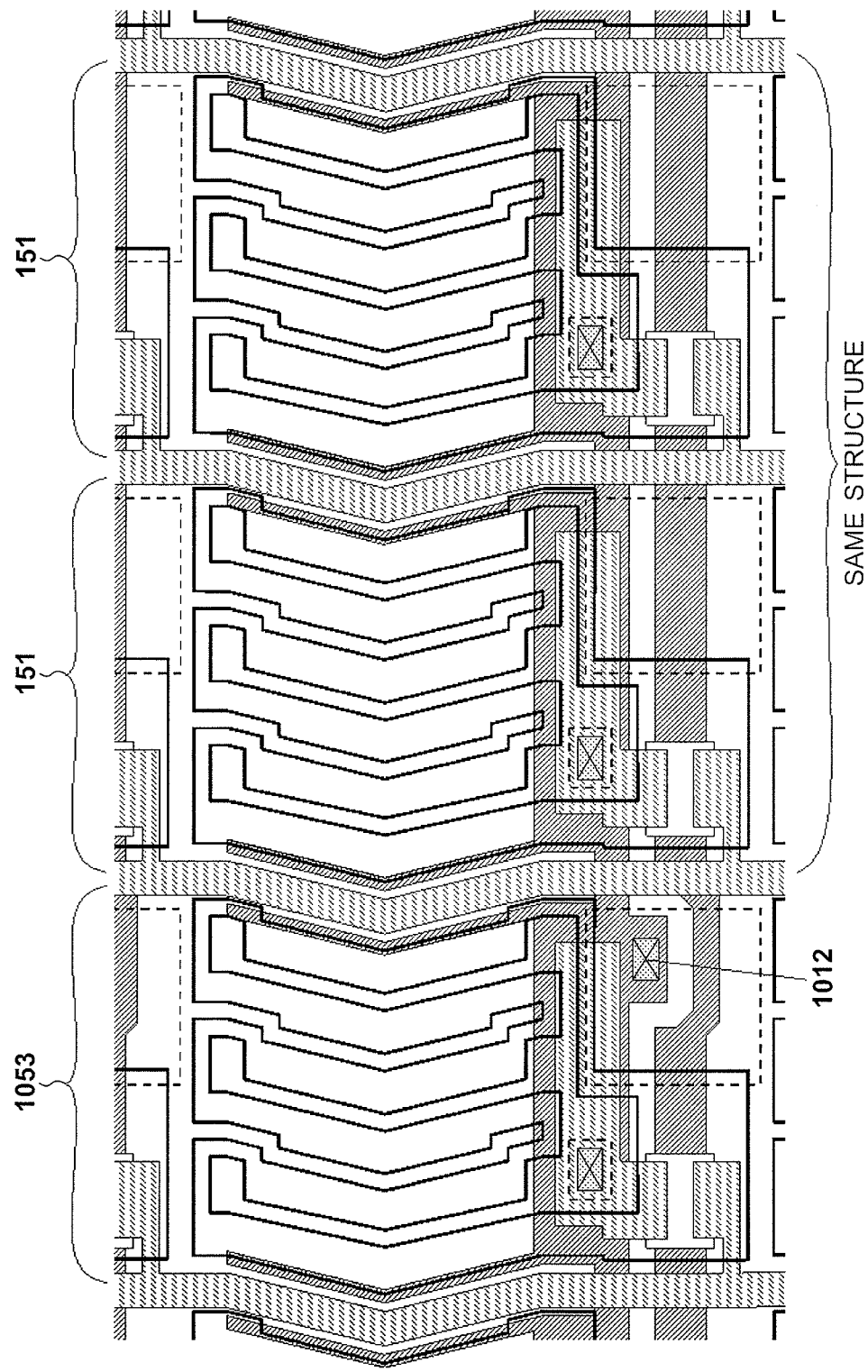
FIG. 11 is a plan view showing sub-pixels for one pixel of the liquid crystal display device according to the third exemplary embodiment, in which a common electrode contact hole for connecting a common signal wiring and a common electrode is provided.
Figure 12:
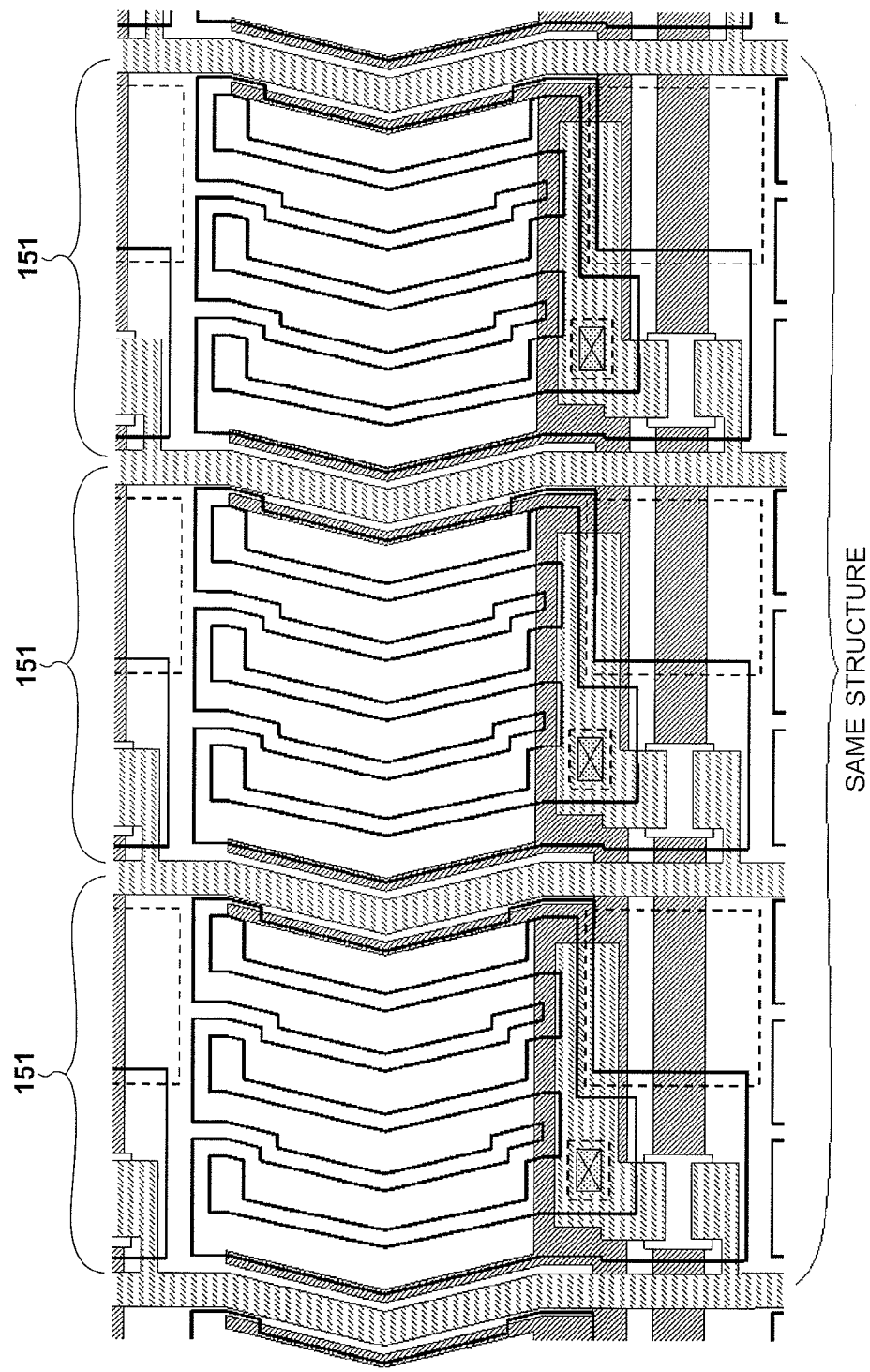
FIG. 12 is a plan view showing sub-pixels for one pixel of the liquid crystal display device according to the third exemplary embodiment, in which a common electrode contact hole for connecting a common signal wiring and a common electrode is omitted.

The third exemplary embodiment of the present invention will be described by referring to FIG. 10A, FIG. 10B, FIG. 11, and FIG. 12. FIG. 10A is a plan view showing a single sub-pixel of a liquid crystal display device according to the third exemplary embodiment, and FIG. 10B is a sectional view of A-A' part of FIG. 10A. FIG. 11 and FIG. 12 are plan views in which sub-pixels for a single pixel are arranged.

The sub-pixel according to the third exemplary embodiment in which the columnar spacer is placed is the same as the sub-pixel 151 (FIG. 1A and FIG. 1B) of the first exemplary embodiment. Further, the sub-pixel having no common-electrode contact hole among the sub-pixels in which the columnar spacer is not placed is also the same as the sub-pixel 151 (FIG. 1A and FIG. 1B) of the first exemplary embodiment except for the existence of the columnar spacer.

FIG. 10A and FIG. 10B are plan views showing a sub-pixel according to the third exemplary embodiment in which the columnar spacer is not placed and a common-electrode contact hole for connecting a common signal wiring and a common electrode is provided.

The difference of the sub-pixel 1053 according to the third exemplary embodiment in which the common-electrode contact hole is provided and the sub-pixel 753 (FIG. 7A and FIG. 7B) according to the second exemplary embodiment in which the common-electrode contact hole is formed is that an organic film is eliminated in a region from the scan signal wiring 1001 to the common signal wiring 1002.

FIG. 11 and FIG. 12 are plan views in which the sub-pixels for a single pixel according to the second exemplary embodiment are arranged.

The single pixel shown in FIG. 11 is constituted with: the sub-pixel 151 in which the columnar spacer 115 is placed; the sub-pixel 151 in which the columnar spacer is not placed and the common-electrode contact hole is not provided (same structure as that of the above-described sub-pixel 151 except for the existence of the columnar spacer); and the sub-pixel 1053 in which the columnar spacer is not placed and the common-electrode contact hole 1012 is provided.

The two sub-pixels 151 correspond to a color filter of blue (B) and a color filter of green (G), respectively, and the sub-pixel 1053 corresponds to a color filter of red (R). As described, it is sufficient to provide a single sub-pixel in which the common-electrode contact hole is provided out of the three sub-pixels within a single pixel.

Further, depending on the pixel, as shown in FIG. 12, all the sub-pixels may be set as the sub-pixels 151 by placing the sub-pixel 151 placed instead of the sub-pixel 1053 in which the common-electrode contact hole 1012 is provided.

The common electrodes 110 (FIG. 1A) are connected to each other in the neighboring pixels and are formed by the transparent conductive film such as ITO. Thus, the common electrodes are of sufficiently low resistance for stabilizing the potentials of the common electrodes over a plurality of pixels. Thus, it is possible to decrease the occurrence probability of faults such as short circuits between the wirings through not providing more than the necessary number of contact holes. Thus, it is desirable to set the number of the sub-pixels in which the common-electrode contact hole is provided to be 1/3 or less of the number of total sub-pixels of the entire pixels.

One each of the columnar spacer may be placed in all the pixels or may be placed in ½ to ⅛ of the entire pixels, for example. In a case where the columnar spacer is placed in all the pixels, the pixel shown in FIG. 11 and the pixel shown in FIG. 12 may be placed in a prescribed ratio. In a case where the columnar spacer is placed in ½ to ⅛ of the entire pixels, the pixel having no columnar spacer may be formed in a structure in which the sub-pixel 151 shown in FIG. 11 or FIG. 12 is provided on the TFT substrate side and no columnar spacer is provided on the counter substrate side.

In Example 1 of the third exemplary embodiment, the columnar spacer was placed in all the pixels, and the pixel shown in FIG. 11 was used for all the pixels. Among the sub-pixels 151 in which the columnar spacer is placed, the proportion of the sub-pixel in which the pedestal 117 is placed and the sub-pixel in which the pedestal 117 is not placed was set to be 1:15. Thereby, among the entire pixels, the main column was placed in 1/16 of the pixels, and the auxiliary column was placed in 15/16 of the pixels. Through reducing the density of the main columns as in this case, faults such as fuzziness of black display caused due to a stress generated by shifts between the both substrates were able to be suppressed, thereby making it possible to acquire a fine display. Further, the number of the sub-pixels 1053 having the common-electrode contact hole was ⅓ of the entire sub-pixels. Through setting the proportion thereof to be ⅓ or less, a sufficiently fine yield was able to be achieved.

In Example 2 of the third exemplary embodiment, the columnar spacer was placed in ¼ of the entire pixels, and the proportion of the pixel shown in FIG. 11 and the pixel shown in FIG. 12 was set to be 1:3. Among the sub-pixels 151 in which the columnar spacer was placed, the proportion of the sub-pixel in which the pedestal 117 was placed and the sub-pixel in which the pedestal 117 was not placed was set to be 1:3. Thereby, among the entire pixels, the main column was placed in 1/16 of the pixels, and the auxiliary column was placed in 3/16 of the remaining pixels. Through reducing the number of auxiliary columns compared to that of Example 1, the alignment failure in the vicinity of the columnar spacer can be reduced, the contrast can be improved, and a still finer display can be acquired even though the load resistance is slightly deteriorated. Further, the number of the sub-pixels 1053 having the common-electrode contact hole was 1/12 of the entire sub-pixels, and the proportion thereof was ⅓ or less. Thereby, a sufficiently fine yield was able to be achieved.

While the number of the main columns is set to be 1/16 of the entire pixels in the cases described above, it is possible to set the number as appropriate within a range of ¼ to 1/48. Further, the density of the auxiliary columns in which the pedestal 117 is not placed can be set as appropriate depending on the balance between the black display quality and the load resistance.

Further, in a case of a small-type in which there is a sufficient margin in signal writing, for example, the entire pixels may be arranged as in FIG. 12 without providing the common-electrode contact hole.

In the third exemplary embodiment, the regions having no flattening film are in a same shape in all the pixels and the scan signal wirings of all the pixels are shielded by the common electrodes. Such structure makes it possible to secure the wide region to the vicinity of the scan signal line as the aperture region, to achieve a higher numerical aperture, and to prevent the light leakage at the time of black display. Thus, a high contrast can be achieved.

(Fourth Exemplary Embodiment)

The fourth exemplary embodiment of the present invention will be described by referring to FIG. 15A, FIG. 15B, FIG.

Figure 15A:
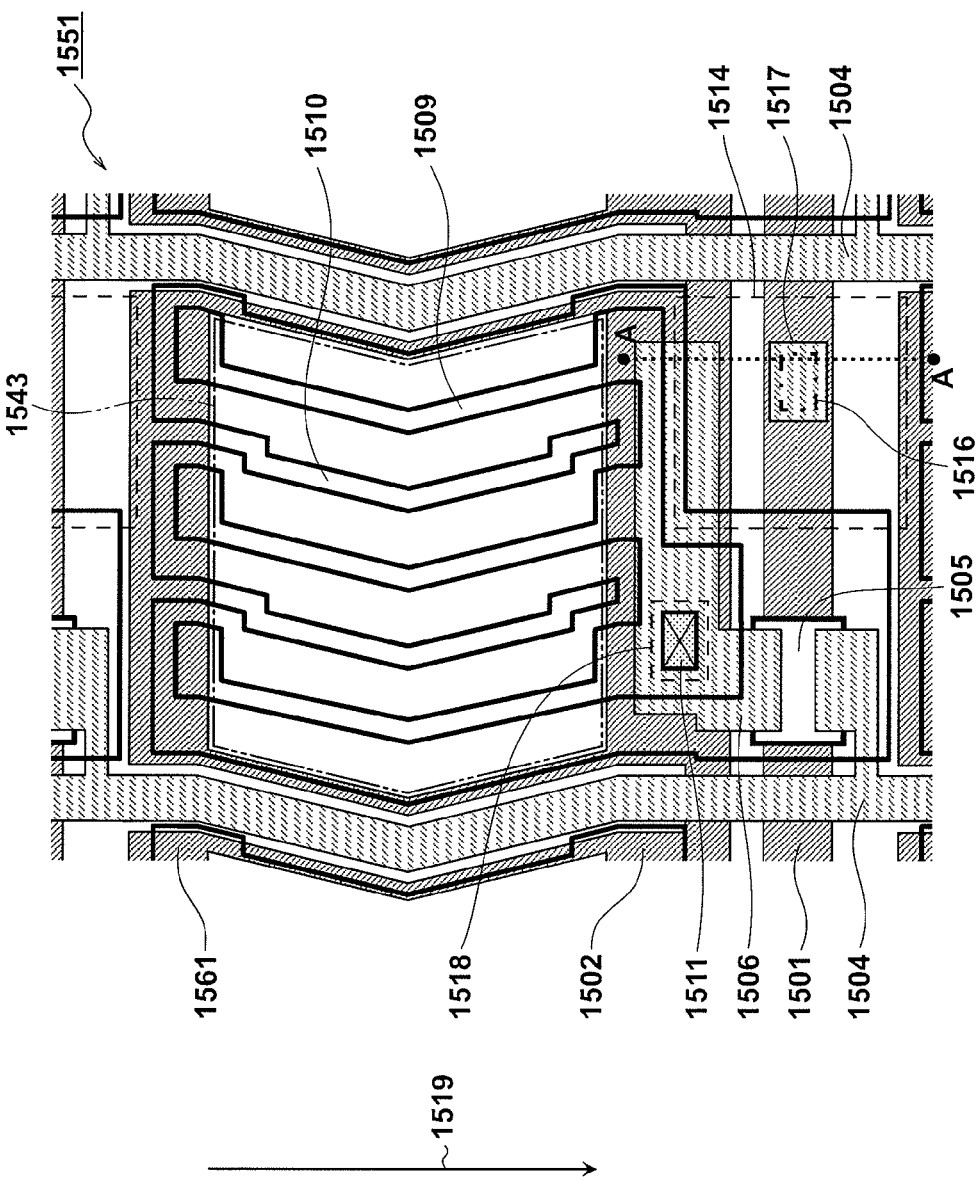
FIG. 15A is a plan view showing a sub-pixel of a liquid crystal display device according to a fourth exemplary embodiment, in which a columnar spacer is placed therein.
Figure 15B:
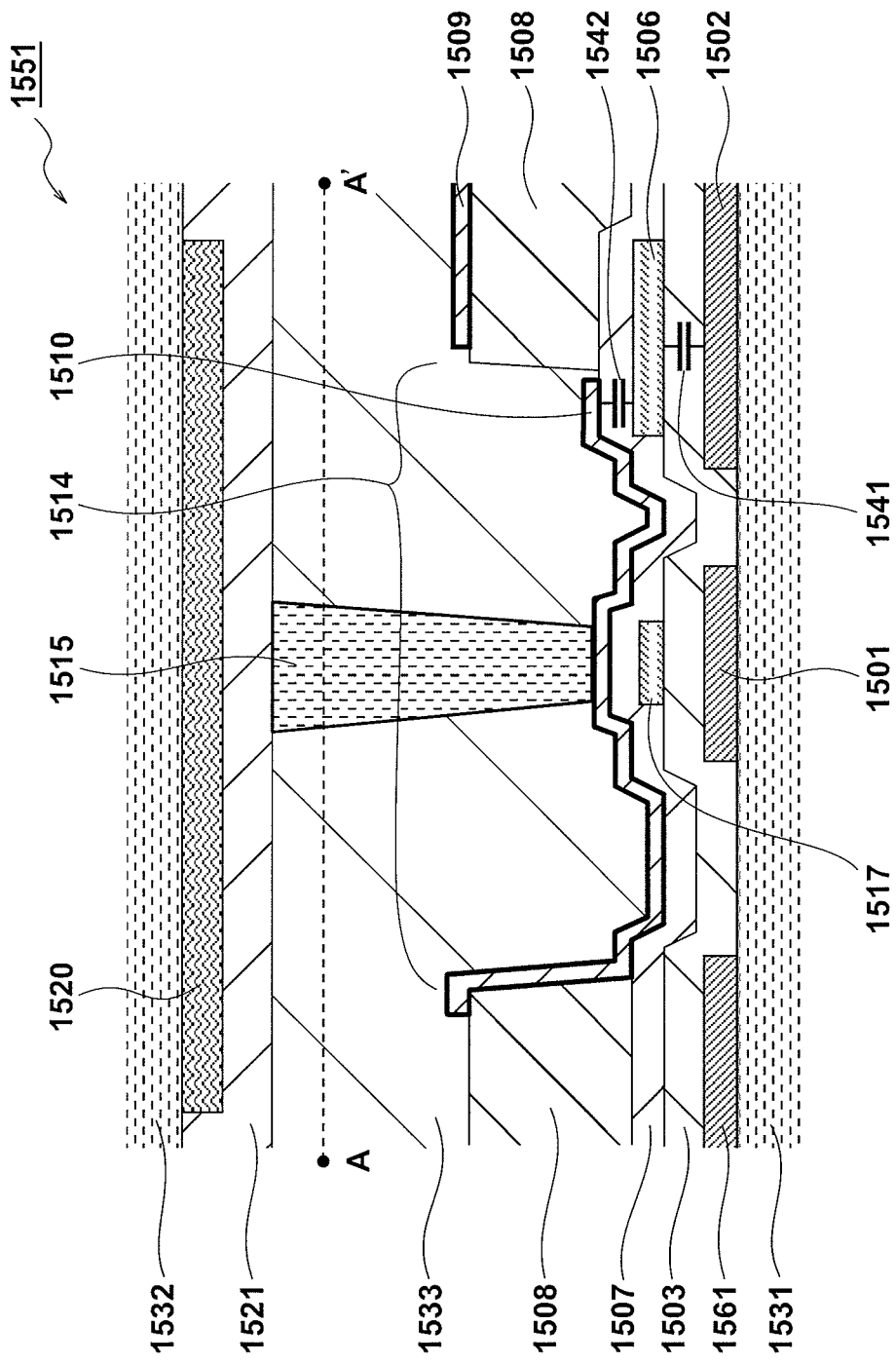
FIG. 15B is a sectional view taken along an A-A' part of FIG. 15A.
Figure 16A:
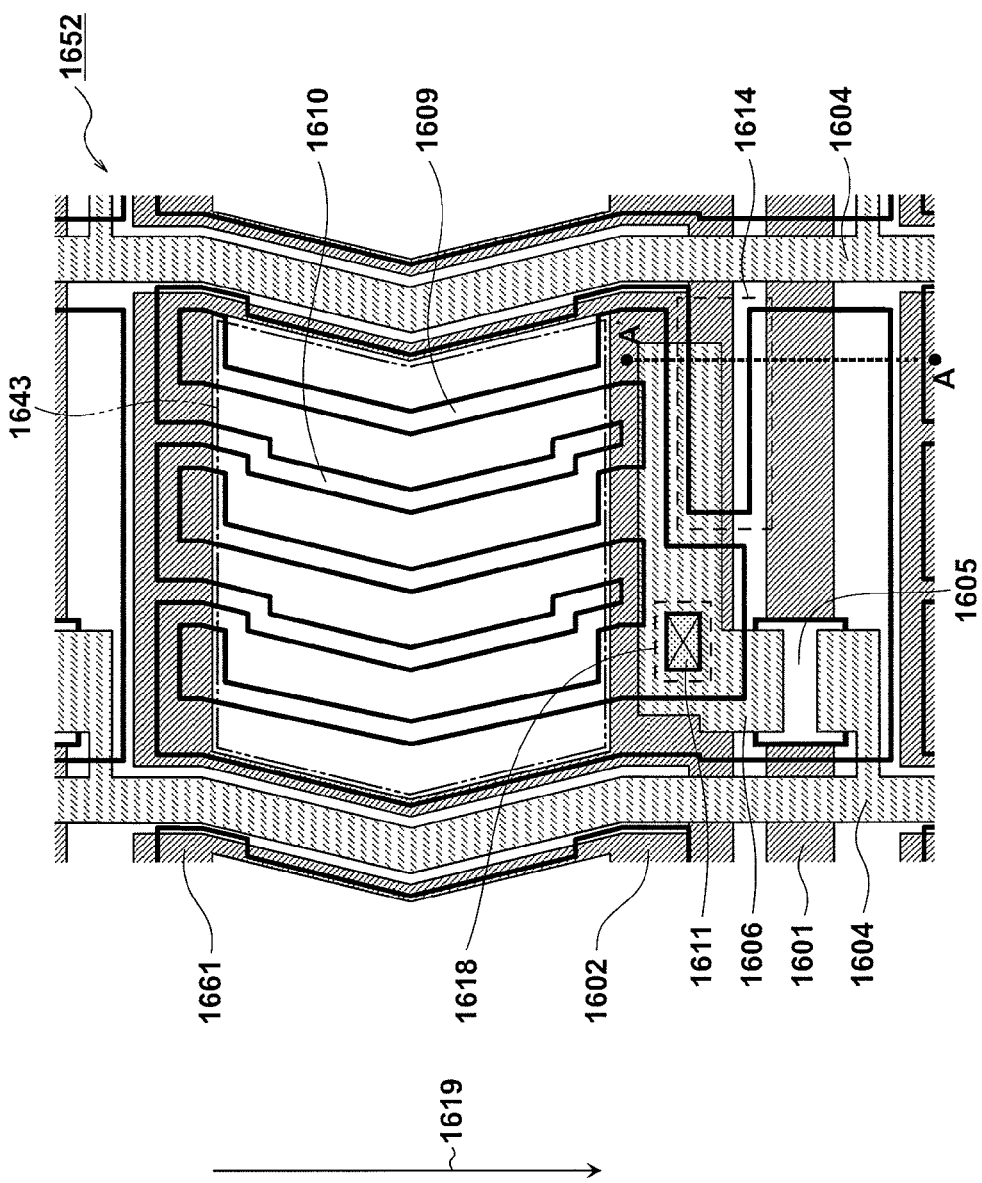
FIG. 16A is a plan view showing a sub-pixel of the liquid crystal display device according to the fourth exemplary embodiment, in which a columnar spacer is not placed.
Figure 16B:
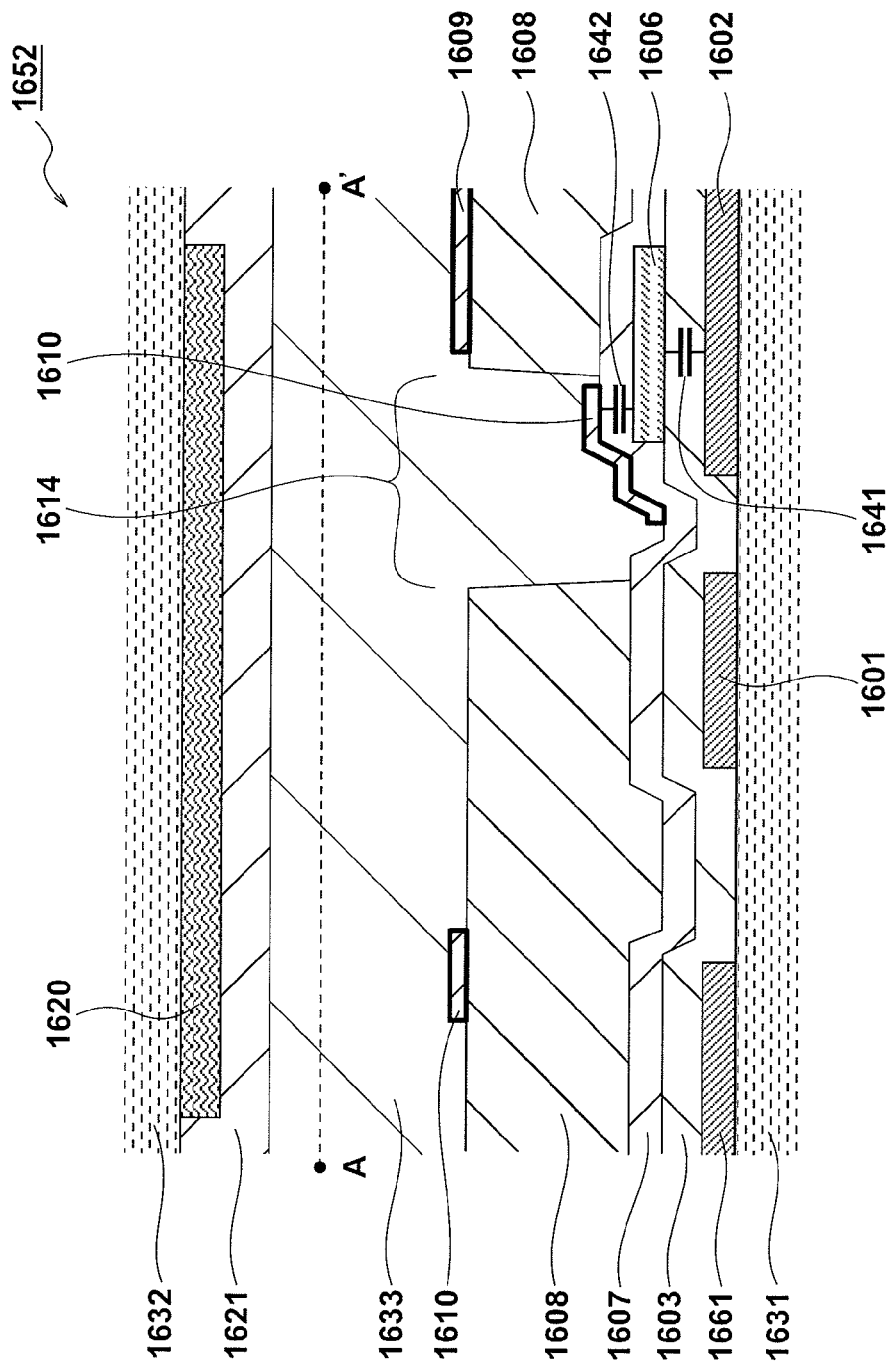
FIG. 16B is a sectional view taken along an A-A' part of FIG. 16A.
Figure 17B:
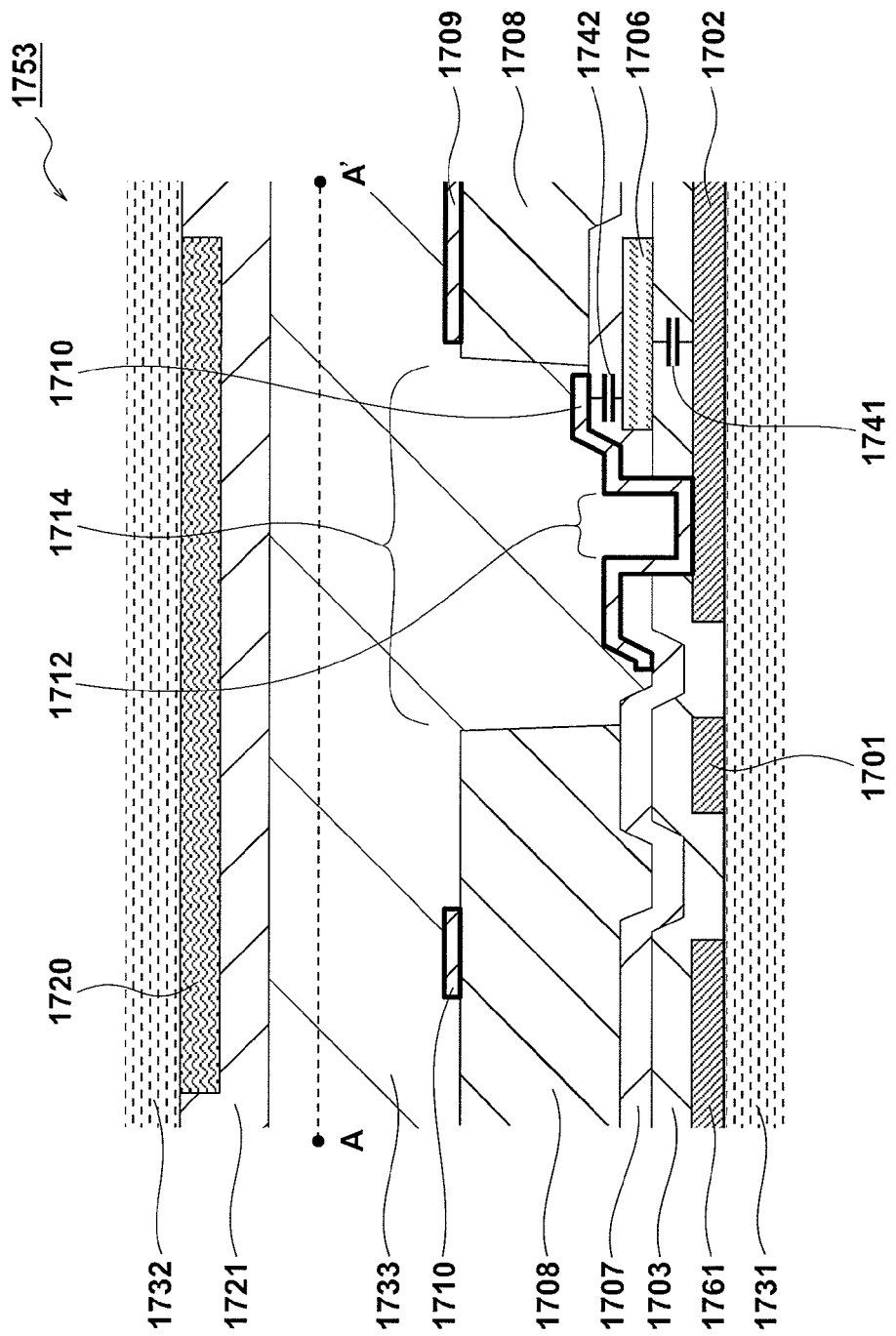
FIG. 17B is a sectional view taken along an A-A' part of FIG. 17A.
Figure 18:
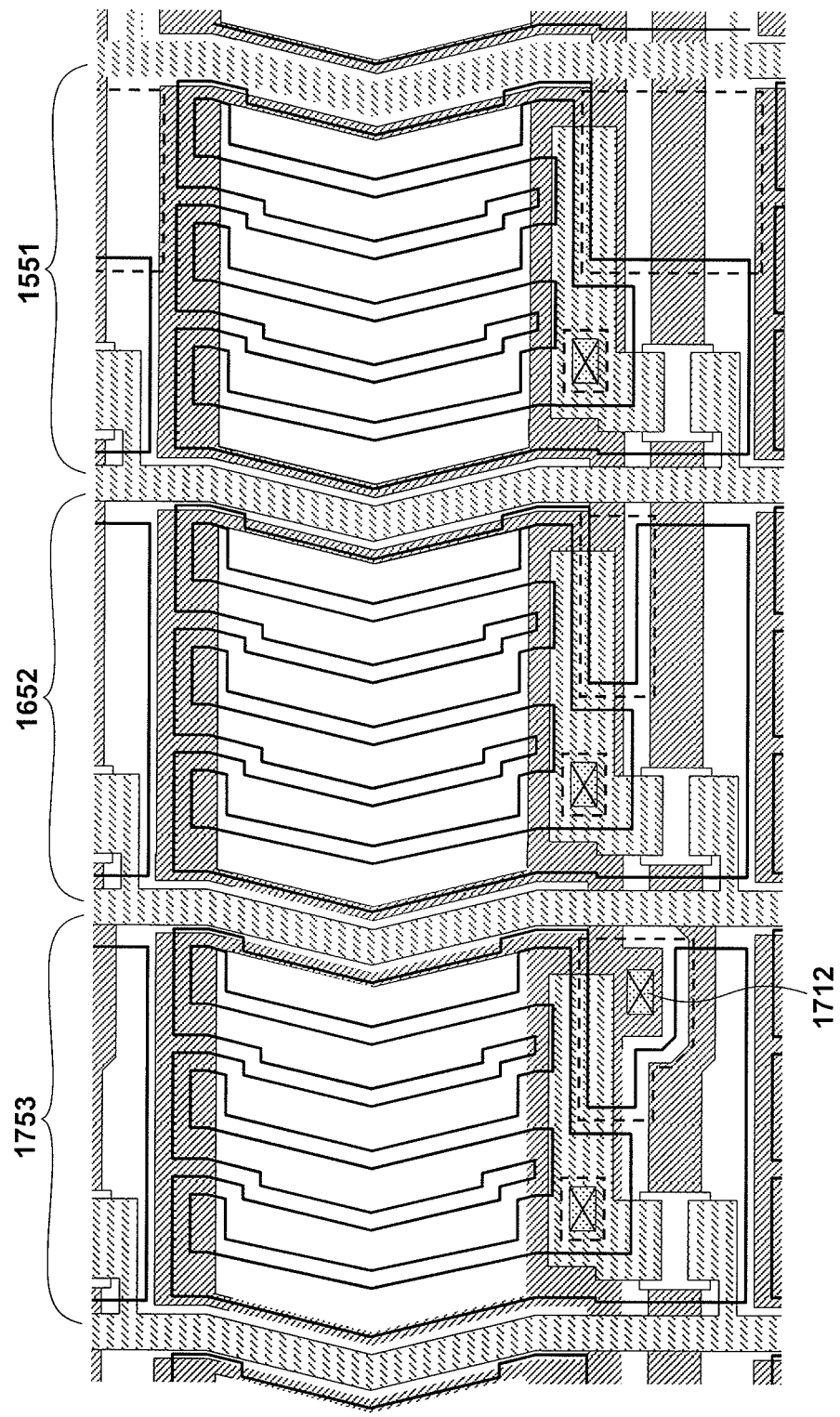
FIG. 18 is a plan view showing sub-pixels for one pixel of the liquid crystal display device according to the fourth exemplary embodiment, in which a common electrode contact hole for connecting a common signal wiring and a common electrode is provided.
Figure 19:
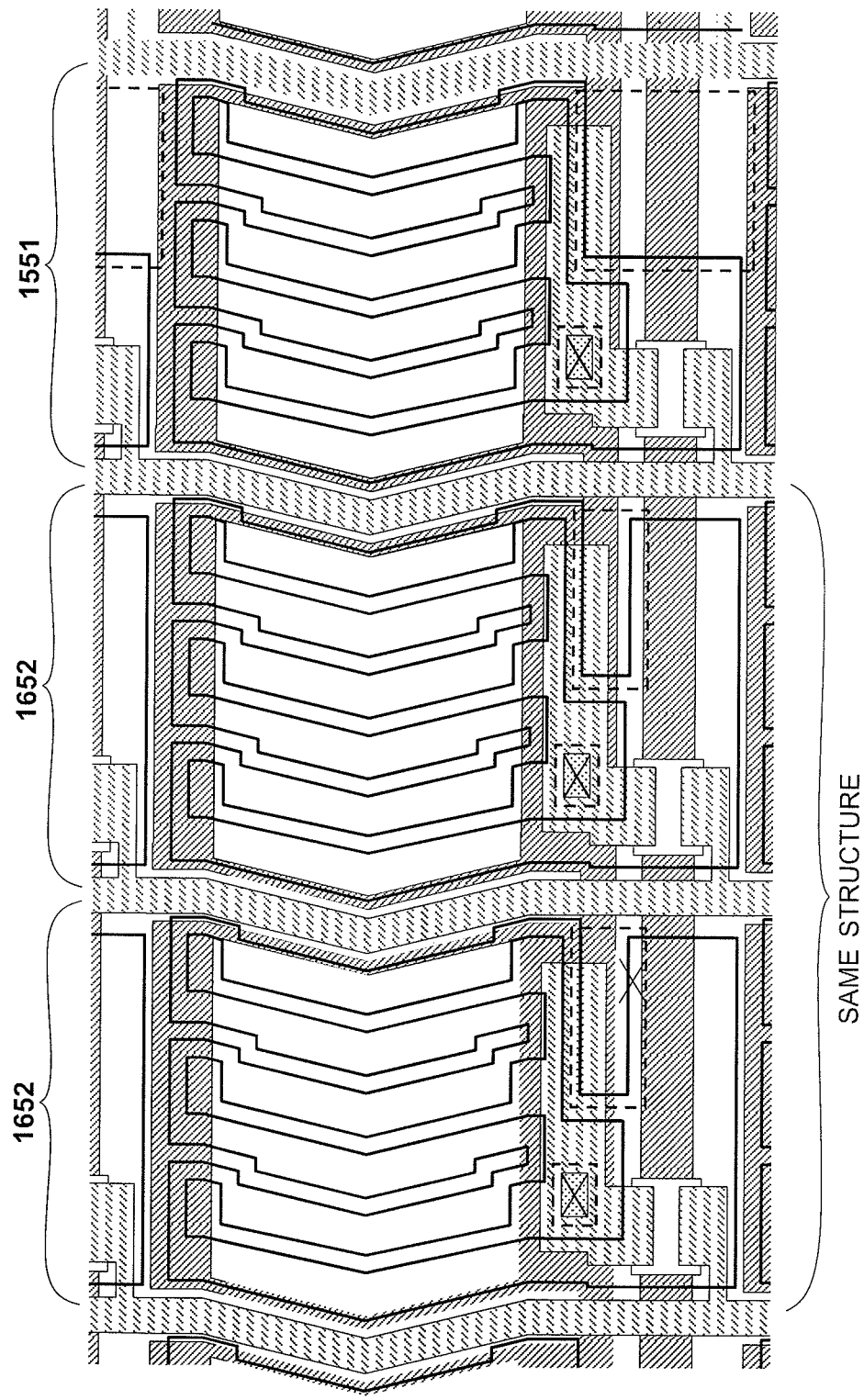
FIG. 19 is a plan view showing sub-pixels for one pixel of the liquid crystal display device according to the fourth exemplary embodiment, in which a common electrode contact hole for connecting a common signal wiring and a common electrode is omitted.

16A, FIG. 16B, FIG. 17A, FIG. 17B, FIG. 18, and FIG. 19. FIG. 15A, FIG. 16A, and FIG. 17A are plan views showing a single sub-pixel of a liquid crystal display device according to the fourth exemplary embodiment. FIG. 15B, FIG. 16B, and FIG. 17B are sectional views of A-A' part of FIG. 15A, FIG. 16A, and FIG. 17A, respectively. FIG. 18 and FIG. 19 are plan views in which sub-pixels for a single pixel are arranged.

The sub-pixel shown in FIG. 15A and FIG. 15B is the sub-pixel 1551 in which the columnar spacer 1515 is placed. The sub-pixel 1551 according to the fourth exemplary embodiment is different from the sub-pixel 151 according to the first exemplary embodiment in respect that the common auxiliary electrode 1561 is provided. The common auxiliary electrode 1561 is formed by the first metal layer connected to the common signal wiring 1502 and is provided in the periphery of the sub-pixel 1551 in a loop form, and it is placed along the scan signal wiring 1501 on the opposite direction side of the direction towards the second storage capacitor 1542 from the scan signal wiring 1501. Note that "plan-view lower side (or upper side)" hereinafter means a lower side (or upper side) of a plan view when looking at the plan view.

Now, issues of the sub-pixel 151 of the first exemplary embodiment will be described by referring to FIG. 1A and FIG. 1B. In the sub-pixel 151, a wide region to the vicinity of the scan signal wiring 101 is secured as an aperture region, so that a high numerical aperture can be acquired. However, in the plan-view lower side (FIG. 1A) than the scan signal wiring 101, the edge of the recessed region 114 is in the vicinity of the aperture region. Thus, when there is a large shift generated in the plan-view lower direction (FIG. 1A) at the time of superimposing the TFT substrate 131 and the counter substrate 132, the columnar spacer 115 may contact the flattening film 108 located on the plan-view lower side (FIG. 1A) of the sidewall of the recessed region 114. In that case, the alignment of the liquid crystal becomes disturbed on the plan-view lower side (FIG. 1A) than the scan signal wiring 101, thereby generating a light leakage at the time of black display. Further, when there is a large shift in the plan-view upper direction (FIG. 1A) as a final superimposing state, the black matrix 120 is also shifted. In that case, there is a leakage of a weak electric field in the vicinity of the scan signal wiring 101, so that the region where the liquid crystal molecules are rotated due to the leakage of the weak electric field is not shielded by the black matrix 120 and may be visually recognized at the time of black display. In the meantime, the common auxiliary electrode 1561 is placed on the plan-view lower side (FIG. 15A) of the scan signal wiring 1501 of the sub-pixel 1551 according to the fourth exemplary embodiment. Thus, even when the superimposing state of the TFT substrate 1531 and the counter substrate 1532 is shifted largely, the light leakage as described above can be suppressed since the common auxiliary electrode 1561 made with the first metal layer has a light shielding function and an electric-field shielding function even though the numerical aperture is slightly deteriorated compared to the case of the first exemplary embodiment.

The sub-pixel shown in FIG. 16A and FIG. 16B is the sub-pixel 1652 in which the columnar spacer is not placed and the common-electrode contact hole is not placed, either. The sub-pixel 1652 according to the exemplary embodiment is different from the sub-pixel 252 according to the second exemplary embodiment in respect that the common auxiliary electrode 1661 is provided. The common auxiliary electrode 1661 is provided in the periphery of the sub-pixel 1652 in a loop form, and it is placed along the scan signal wiring 1601 on the plan-view lower side (FIG. 16A) than the scan signal wiring 1601.

Now, issues of the sub-pixel 252 of the second exemplary embodiment will be described by referring to FIG. 2A and FIG. 2B. In the sub-pixel 252, the columnar spacer is not placed unlike the case of the sub-pixel 151. Thus, even when there is a large shift generated in the plan-view lower direction (FIG. 2A) at the time of superimposing the TFT substrate 231 and the counter substrate 232, the light leakage at the time of black display due to a contact of the columnar spacer to the flattening film is not generated. However, when there is a large shift generated in the plan-view upper direction (FIG. 2A) at the time of superimposing the TFT substrate 231 and the counter substrate 232, the region of a weak electric field leakage in the vicinity of the scan signal wiring 201 is not shielded by the black matrix 220 and may be visually recognized at the time of black display.

In the meantime, the common auxiliary electrode 1661 is placed on the plan-view lower side (FIG. 16A) of the scan signal wiring 1601 of the sub-pixel 1652 according to the fourth exemplary embodiment. Thus, even when the superimposing state of the TFT substrate 1631 and the counter substrate 1632 is shifted largely, the light leakage as described above can be suppressed since the common auxiliary electrode 1661 made with the first metal layer has a light shielding function and an electric-field shielding function even though the numerical aperture is slightly deteriorated compared to the case of the first exemplary embodiment.

The sub-pixel shown in FIG. 17A and FIG. 17B is the sub-pixel 1753 in which the columnar spacer is not placed and the common-electrode contact hole 1712 for connecting the common signal wiring 1702 and the common electrode 1710 is provided. The sub-pixel 1753 according to the fourth exemplary embodiment is different from the sub-pixel 353 according to the first exemplary embodiment in respect that the common auxiliary electrode 1761 is provided. The common auxiliary electrode 1761 is provided in the periphery of the sub-pixel 1753 in a loop form, and it is placed along the scan signal wiring 1701 on the plan-view lower side (FIG. 17A) than the scan signal wiring 1701.

Now, issues of the sub-pixel 353 of the first exemplary embodiment will be described by referring to FIG. 3A and FIG. 3B. In the sub-pixel 353, the columnar spacer is not placed unlike the case of the sub-pixel 151. Thus, even when there is a large shift generated in the plan-view lower direction (FIG. 3A) at the time of superimposing the TFT substrate 331 and the counter substrate 332, the light leakage at the time of black display is not generated. However, when there is a large shift generated in the plan-view upper direction (FIG. 3A) at the time of superimposing the TFT substrate 331 and the counter substrate 332, the region of the weak electric field leakage in the vicinity of the scan signal wiring 301 is not shielded by the black matrix 320 and may be visually recognized at the time of black display.

In the meantime, the common auxiliary electrode 1761 is placed also on the plan-view lower side (FIG. 17A) of the scan signal wiring 1701 in the sub-pixel 1753 according to the fourth exemplary embodiment. Thus, even when the superimposing state of the TFT substrate 1731 and the counter substrate 1732 is shifted largely, the light leakage as described above can be suppressed since the common auxiliary electrode 1761 made with the first metal layer has a light shielding function and an electric-field shielding function even though the numerical aperture is slightly deteriorated compared to the case of the first exemplary embodiment.

FIG. 18 and FIG. 19 are plan views in which the sub-pixels for a single pixel according to the fourth exemplary embodiment are arranged.

The difference of the fourth exemplary embodiment with respect to the first exemplary embodiment (FIG. 4) is that the common auxiliary electrode is extended in a loop form and placed on the plan-view lower side of the scan signal wiring.

The single pixel shown in FIG. 18 is constituted with: the sub-pixel 1551 in which the columnar spacer 1515 is placed; the sub-pixel 1652 in which the columnar spacer is not placed and the common-electrode contact hole is not provided; and the sub-pixel 1753 in which the columnar spacer is not placed and the common-electrode contact hole 1712 is provided. The sub-pixel 1551 corresponds to a color filter of blue (B), the sub-pixel 1652 corresponds to a color filter of green (G), and the sub-pixel 1753 corresponds to a color filter of red (R). As described, it is sufficient to provide a single sub-pixel in which the common-electrode contact hole is provided out of the three sub-pixels within a single pixel.

Further, depending on the pixel, as shown in FIG. 19, the sub-pixel 1652 in which the common-electrode contact hole is not provided may be placed instead of the sub-pixel 1753 in which the common-electrode contact hole 1712 is provided. That is, the single pixel shown in FIG. 18 is constituted with the two sub-pixels 1652 in which the columnar spacer is not placed and the common-electrode contact hole is not provided as well as the sub-pixel 1753 in which the columnar spacer is not placed and the common-electrode contact hole 1712 is provided. The common electrodes 1510, 1610, and 1710 (FIG. 15A, FIG. 16A, FIG. 17A) are connected to each other in the neighboring pixels and are formed by the transparent conductive films such as ITO. Thus, the common electrodes are of sufficiently low resistance for stabilizing the potentials of the common electrodes over a plurality of pixels. Thus, it is possible to decrease the occurrence probability of faults such as short circuits between the wirings through not providing more than the necessary number of contact holes. Thus, it is desirable to set the number of the sub-pixels in which the common-electrode contact hole is provided to be $\frac{1}{3}$ or less of the number of total sub-pixels of the entire pixels.

One each of the columnar spacer may be placed in all the pixels or may be placed in $\frac{1}{2}$ to $\frac{1}{8}$ of the entire pixels, for example. In a case where the columnar spacer is placed in all the pixels, the pixel shown in FIG. 18 and the pixel shown in FIG. 19 may be placed in a prescribed ratio. In a case where the columnar spacer is placed in $\frac{1}{2}$ to $\frac{1}{8}$ of the entire pixels, the pixel having no columnar spacer may be formed in a structure in which the sub-pixel 1551 is placed in the TFT substrate side and no columnar spacer is placed on the counter substrate side as shown in FIG. 18 or FIG. 19 or may be formed in a structure in which the sub-pixel 1551 shown in FIG. 18 or FIG. 19 is replaced with the sub-pixel 1652.

In Example 1 of the fourth exemplary embodiment, the columnar spacer was placed in all the pixels, and the pixel shown in FIG. 18 was used for all the pixels. Among the sub-pixels 1551 in which the columnar spacer is placed, the proportion of the sub-pixel in which the pedestal 1517 is placed and the sub-pixel in which the pedestal 1517 is not placed was set to be 1:15. Thereby, among the entire pixels, the main column was placed in $\frac{1}{16}$ of the pixels, and the auxiliary column was placed in $\frac{15}{16}$ of the pixels. Through reducing the density of the main columns in this way, faults such as fuzziness of black display caused due to a stress generated by shifts between the both substrates were able to be suppressed, thereby making it possible to acquire a fine display. Further, the number of the sub-pixels 1753 having the common-electrode contact hole was $\frac{1}{3}$ of the entire sub-pixels. Through setting the proportion thereof to be $\frac{1}{3}$ or less, a sufficiently fine yield was able to be achieved.

In Example 2 of the fourth exemplary embodiment, the columnar spacer was placed in $\frac{1}{4}$ of the entire pixels, and the proportion of the pixel shown in FIG. 18 and the pixel shown in FIG. 19 was set to be 1:3 and the pixels were arranged in a periodic manner. Among the sub-pixels 1551 in which the columnar spacer was placed, the proportion of the sub-pixel in which the pedestal 1517 was placed and the sub-pixel in which the pedestal 1517 was not placed was set to be 1:3. Thereby, among the entire pixels, the main column was placed in $\frac{1}{16}$ of the pixels, and the auxiliary column was placed in $\frac{3}{16}$ of the remaining pixels. Through reducing the number of auxiliary columns compared to that of Example 1, the alignment failure in the vicinity of the columnar spacer can be reduced, the contrast can be improved, and a still finer display can be acquired even though the load resistance is slightly deteriorated. Thus, a still finer display was able to be acquired. Further, the number of the sub-pixels 1753 having the common-electrode contact hole was $\frac{1}{12}$ of the entire sub-pixels, and the proportion thereof was $\frac{1}{3}$ or less. Thereby, a sufficiently fine yield was able to be achieved.

Further, in a case of a small-type in which there is a sufficient margin in signal writing, for example, the entire pixels may be arranged as in FIG. 19 without providing the common-electrode contact hole.

Through employing such structure, the fourth exemplary embodiment makes it possible to secure a sufficiently wide region as the aperture region and to achieve a high numerical aperture even though the numerical aperture is slightly deteriorated compared to the case of the first exemplary embodiment. Thus, it is possible to acquire a high contrast since the light leakage at the time of black display can be more securely suppressed even when there is a shift generated in a superimposing state of the TFT substrate and the counter substrate at the time of manufacture. While the first to fourth exemplary embodiments have been described above by mainly referring to the case of color display, the present invention can also be applied to monochrome display by omitting the color layers of the color filters on the counter substrate side. For example, in the case of the fourth exemplary embodiment, the counter substrate can be constituted only with the black matrixes 1520, 1620, 1720, the overcoats 1521, 1621, 1721, and the columnar spacer 1515, and the TFT substrate side can be formed with the same sub-pixel structure as that of Example 1 of the fourth exemplary embodiment. In that case, it is also possible to acquire a liquid crystal display device of high luminance and high contrast as those of the fourth exemplary embodiment through employing the present invention. Similarly, the first to third exemplary embodiments can be applied to monochrome display as well.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

A part of or a whole part of the exemplary embodiments disclosed above can be expressed appropriately by the contents depicted in following Supplementary Notes. However, it is to be noted that the modes for carrying out the present invention and the technical spirit of the present invention are not limited to those contents.

(Supplementary Note 1)

An IPS liquid crystal display device which drives a liquid crystal layer by an electric field generated between a common electrode and a pixel electrode, and the device includes: a TFT substrate in which a great number of sub-pixels having display regions are provided in matrix; a counter substrate provided by opposing to the TFT substrate; the liquid crystal layer sandwiched between the counter substrate and the TFT substrate; a scan signal wiring and a common signal wiring provided on the TFT substrate; a first insulating film provided on the TFT substrate, the scan signal wiring, and the common signal wiring; a source electrode provided on the first insulating film; a second insulating film provided on the first insulating film and the source electrode; a flattening film provided on the second insulating film; the common electrode made with a transparent conductive film, which is provided on the flattening film and connected to the common signal wiring; and the pixel electrode made with a transparent conductive film, which is provided on the flattening film and connected to the source electrode, wherein: the flattening film is formed in all areas of the display regions; a recessed region constituted with a region on the second insulating film where the flattening film is not provided includes a part on the source electrode; and the common electrode is extended inside the recessed region. The liquid crystal display device further includes: a first storage capacitor constituted with a structure in which the first insulating film is sandwiched between the common signal wiring and the source electrode; and a second storage capacitor provided inside the recessed region, which is constituted with a structure in which the second insulating film is sandwiched between the common electrode and the source electrode.

(Supplementary Note 2)

The liquid crystal display device as depicted in Supplementary Note 1, which further includes: a columnar spacer provided on the counter substrate for keeping a gap between the counter substrate and the TFT substrate; a sub-pixel in which the columnar spacer is placed; and a sub-pixel in which the columnar spacer is not placed, wherein the recessed region in the sub-pixel in which the columnar spacer is placed is continuously formed to a region that supports the columnar spacer, and the common electrode inside the recessed region covers the scan signal wiring, the source electrode, and an area between the scan signal wiring and the source electrode via the second insulating film.

(Supplementary Note 3)

The liquid crystal display device as depicted in Supplementary Note 2, which further includes a common auxiliary electrode which is formed with a same layer as that of the common signal wiring and connected to the common signal wiring, wherein the common auxiliary electrode is disposed along the scan signal wiring on a side opposing to the second storage capacitor with the scan signal wiring interposed therebetween.

(Supplementary Note 4)

The liquid crystal display device as depicted in Supplementary Note 2 or 3, wherein an upper side of the scan signal wiring in the sub-pixel in which the columnar spacer is not placed is covered by the flattening film and not covered by the common electrode.

(Supplementary Note 5)

The liquid crystal display device as depicted in Supplementary Note 2 or 3, wherein an upper side of the scan signal wiring in the sub-pixel in which the columnar spacer is not placed is covered by the flattening film and covered by the common electrode via the flattening film.

(Supplementary Note 6)

The liquid crystal display device as depicted in Supplementary Note 2 or 3, wherein: shapes of the recessed regions of the sub-pixel in which the columnar spacer is placed and the sub-pixel in which the columnar spacer is not placed are same shapes; and within the recessed region of the sub-pixel in which the columnar spacer is not placed, the common electrode covers the scan signal wiring, the source electrode, and the area between the scan signal wiring and the source electrode via the second insulating film.

(Supplementary Note 7)

The liquid crystal display device as depicted in any one of Supplementary Notes 2 to 6, which further includes: a sub-pixel including a common-electrode contact hole which electrically connects the common signal wiring and the common electrode; and a sub-pixel not including the common-electrode contact hole.

(Supplementary Note 8)

The liquid crystal display device as depicted in Supplementary Note 7, wherein proportion of the sub-pixels including the common-electrode contact hole out of the entire sub-pixels is $1/3$ or less, and the sub-pixels including the common-electrode contact hole are arranged at a prescribed period in the entire sub-pixels.

(Supplementary Note 9)

The liquid crystal display device as depicted in Supplementary Note 7 or 8, wherein: the columnar spacer is placed in some of the sub-pixels not including the common-electrode contact hole; and the columnar spacer is not placed in the sub-pixels including the common-electrode contact hole.

(Supplementary Note 10)

A liquid crystal display device that is an IPS active matrix type liquid crystal display device in which a liquid crystal material is sandwiched between a first substrate and a second substrate, and the device includes: a scan signal wiring made with a first metal layer formed on the first substrate (a transparent insulating substrate); a gate insulating film formed on the scan signal wiring; a thin-film semiconductor layer and a video signal wiring as well as a source electrode made with a second metal layer formed on the gate insulating film; an inorganic insulating film formed on the thin-film semiconductor layer, the video signal wiring, and the source electrode; a flattening film formed on the inorganic insulating film; and a common electrode and a pixel electrode made with a transparent conductive film provided on a higher layer than the inorganic insulating film, wherein: the pixel electrode is connected to the source electrode via a contact hole; on the second substrate (glass substrate), at least a light-shielding layer and a columnar spacer for keeping a gap between the first substrate and the second substrate are provided; a recessed region in which the flattening film is not formed exists in a part of the source electrode; and the common electrode covers the source electrode in the recessed region to form a storage capacitor.

(Supplementary Note 11)

The liquid crystal display device as depicted in Supplementary Note 10, wherein, in a sub-pixel in which the columnar spacer is placed among a plurality of sub-pixels, a spacer supporting region which supports the columnar spacer on the first substrate has no flattening film so that it is included in the recessed region, and the common electrode covers the scan signal wiring, the source electrode, and an area between the both in the recessed region.

(Supplementary Note 12)

The liquid crystal display device as depicted in Supplementary Note 10 or 11, wherein: in a sub-pixel in which the columnar spacer is not placed, the flattening film exists on the scan signal wiring; in the sub-pixel in which the columnar spacer is placed, the flattening film does not exist only in the vicinity of a part on the source electrode; and in the sub-pixel in which the columnar spacer is not placed, the scan signal wiring is not covered by the common electrode.

(Supplementary Note 13)

The liquid crystal display device as depicted in Supplementary Note 10 or 11, wherein: in a sub-pixel in which the columnar spacer is not placed, the flattening film exists on the scan signal wiring; in the sub-pixel in which the columnar spacer is placed, the flattening film does not exist only in the vicinity of a part on the source electrode; and in the sub-pixel in which the columnar spacer is not placed, the scan signal wiring is covered by the common electrode.

(Supplementary Note 14)

The liquid crystal display device as depicted in Supplementary Note 10 or 11, wherein: the recessed region in the sub-pixel in which the columnar spacer is not placed is in a same shape as the recessed region in the sub-pixel in which the columnar spacer is placed; and in the sub-pixel in which the columnar spacer is not placed, the scan signal wiring is covered by the common electrode.

(Supplementary Note 15)

The liquid crystal display device as depicted in any one of Supplementary Notes 10 to 14, wherein: there are the sub-pixel in which the common electrode and the common signal wiring are connected via a contact hole and the sub-pixel in which the common electrode and the common signal wiring are not connected via the contact hole.

(Supplementary Note 16)

The liquid crystal display device as depicted in Supplementary Note 15, wherein the proportion of the sub-pixels in which the common electrode and the common signal wiring are connected via the contact hole is ⅓ or less of the entire sub-pixels, and such pixels are placed at a prescribed period.

(Supplementary Note 17)

The liquid crystal display device as depicted in Supplementary Note 15 or 16, wherein the sub-pixel in which the common electrode and the common signal wiring are connected via the contact hole is different from the sub-pixel in which the columnar spacer is placed.

(Supplementary Note 18)

An IPS liquid crystal display device which applies an electric field generated between a common electrode and a pixel electrode to a liquid crystal material, and the device includes: a TFT substrate; a counter substrate provided by opposing to the TFT substrate; the liquid crystal material sandwiched between the counter substrate and the TFT substrate; a scan signal wiring and a common signal wiring provided partially on the TFT substrate; a first insulating film provided on the TFT substrate including the scan signal wiring and the common signal wiring; a source electrode provided partially on the first insulating film; a second insulating film provided on the first insulating film including the source electrode; a flattening film provided partially on the second insulating film; a recessed region constituted with a region on the second insulating film where the flattening film is not provided; the pixel electrode made with a transparent conductive film, which is provided partially on the flattening film and electrically connected to the source electrode; the common electrode made with a transparent conductive film, which is provided partially on the flattening film as well as the second insulating film within the recessed region and electrically connected to the common signal wiring; a first storage capacitor constituted with a structure in which the first insulating film is sandwiched between the common signal wiring and the source electrode; and a second storage capacitor provided inside the recessed region, which is constituted with a structure in which the second insulating film is sandwiched between the common electrode and the source electrode.

(Supplementary Note 19)

The liquid crystal display device as depicted in Supplementary Note 18, wherein, in the recessed region, the common electrode covers the scan signal wiring via the second insulating film.

(Supplementary Note 20)

The liquid crystal display device as depicted in Supplementary Note 18, which further includes: a columnar spacer provided on the counter substrate for keeping the gap between the counter substrate and the TFT substrate; a first sub-pixel in which the columnar spacer is placed; and a second sub-pixel in which the columnar spacer is not placed, wherein an upper side of the scan signal wiring in the second sub-pixel is covered by the flattening film and not covered by the common electrode.

(Supplementary Note 21)

The liquid crystal display device as depicted in Supplementary Note 18, which further includes: a columnar spacer provided on the counter substrate for keeping the gap between the counter substrate and the TFT substrate; a first sub-pixel in which the columnar spacer is placed; and a second sub-pixel in which the columnar spacer is not placed, wherein an upper side of the scan signal wiring in the second sub-pixel is covered by the flattening film and covered by the common electrode via the flattening film.

(Supplementary Note 22)

The liquid crystal display device as depicted in Supplementary Note 18, which further includes: a columnar spacer provided on the counter substrate for keeping the gap between the counter substrate and the TFT substrate; a first sub-pixel in which the columnar spacer is placed; and a second sub-pixel in which the columnar spacer is not placed, wherein shapes of the recessed regions of the first sub-pixel and the second-sub-pixel are same shapes, and an upper side of the scan signal wiring within the recessed region of the second sub-pixel is covered by the common electrode.

(Supplementary Note 23)

The liquid crystal display device as depicted in Supplementary Note 18, which further includes: a third sub-pixel having a contact hole which electrically connects the common signal wiring and the common electrode; and a fourth sub-pixel not having the contact hole.

(Supplementary Note 24)

The liquid crystal display device as depicted in Supplementary Note 23, wherein: the proportion of the third sub-pixels occupying the sum of the number of the third sub-pixels and the number of the fourth sub-pixels is ⅓ or less, and the third sub-pixel and the fourth sub-pixel are arranged at a prescribed period.

(Supplementary Note 25)

The liquid crystal display device as depicted in Supplementary Note 23 or 24, which further includes a columnar spacer provided on the counter substrate for keeping the gap between the counter substrate and the TFT substrate, wherein: the columnar spacer is placed in some of the fourth sub-pixels; and the columnar spacer is not placed in the third sub-pixels.

INDUSTRIAL APPLICABILITY

The present invention can be utilized for IPS active-matrix type liquid crystal display devices and for arbitrary apparatuses that utilize those as display devices thereof.

The invention claimed is:

1. An in-plane switching (IPS) liquid crystal display device which drives a liquid crystal layer by an electric field generated between a common electrode and a pixel electrode, comprising:

a thin film transistor (TFT) substrate in which a great number of sub-pixels having display regions are provided in matrix, each display region being associated with a corresponding sub-pixel;

a counter substrate provided by opposing to the TFT substrate;

the liquid crystal layer sandwiched between the counter substrate and the TFT substrate;

a scan signal wiring and a common signal wiring provided on the TFT substrate;

a first insulating film provided on the TFT substrate, the scan signal wiring, and the common signal wiring;

a source electrode provided on the first insulating film;

a second insulating film provided on the first insulating film and the source electrode;

a flattening film provided on the second insulating film;

the common electrode made with a transparent conductive film, which is provided on the flattening film and connected to the common signal wiring; and the pixel electrode made with a transparent conductive film, which is provided on the flattening film and connected to the source electrode, wherein:

the flattening film is formed in all areas of the display regions;

a recessed region constituted with a region on the second insulating film where the flattening film is not provided includes a part on the source electrode; and the common electrode is extended inside the recessed region, the liquid crystal display device further comprising:

a first storage capacitor constituted with a structure in which the first insulating film is sandwiched between the common signal wiring and the source electrode; and a second storage capacitor provided inside the recessed region, which is constituted with a structure in which the second insulating film is sandwiched between the common electrode and the source electrode, the liquid crystal display device further comprising:

a columnar spacer provided on the counter substrate for keeping a gap between the counter substrate and the TFT substrate;

a sub-pixel in which the columnar spacer is placed; and a sub-pixel in which the columnar spacer is not placed, wherein a recessed region in the sub-pixel in which the columnar spacer is placed is continuously formed to a region that supports the columnar spacer, and the common electrode inside the recessed region covers the scan signal wiring, the source electrode, and an area between the scan signal wiring and the source electrode via the second insulating film.

2. The liquid crystal display device as claimed in claim 1, further comprising a common auxiliary electrode which is formed with a same layer as that of the common signal wiring and connected to the common signal wiring, wherein the common auxiliary electrode is disposed along the scan signal wiring on a side opposing to the second storage capacitor with the scan signal wiring interposed therebetween.

3. The liquid crystal display device as claimed in claim 1, wherein an upper side of the scan signal wiring in the sub-pixel in which the columnar spacer is not placed is covered by the flattening film and not covered by the common electrode.

4. The liquid crystal display device as claimed in claim 1, wherein an upper side of the scan signal wiring in the sub-pixel in which the columnar spacer is not placed is covered by the flattening film and covered by the common electrode via the flattening film.

5. The liquid crystal display device as claimed in claim 1, wherein:

shapes of the recessed regions of the sub-pixel in which the columnar spacer is placed and the sub-pixel in which the columnar spacer is not placed are same shapes; and within the recessed region of the sub-pixel in which the columnar spacer is not placed, the common electrode covers the scan signal wiring, the source electrode, and the area between the scan signal wiring and the source electrode via the second insulating film.

6. The liquid crystal display device as claimed in claim 1, further comprising:

a sub-pixel including a common-electrode contact hole which electrically connects the common signal wiring and the common electrode; and a sub-pixel not including the common-electrode contact hole.

7. The liquid crystal display device as claimed in claim 6, wherein proportion of the sub-pixels including the common-electrode contact hole out of the entire sub-pixels is ⅓ or less, and the sub-pixels including the common-electrode contact hole are arranged at a prescribed period in the entire sub-pixels.

8. The liquid crystal display device as claimed in claim 6, wherein:

the columnar spacer is placed in some of the sub-pixels not including the common-electrode contact hole; and the columnar spacer is not placed in the sub-pixels including the common-electrode contact hole.

* * * * *